United States Patent
Mandel et al.

(10) Patent No.: US 8,856,107 B2
(45) Date of Patent: *Oct. 7, 2014

(54) METHOD AND APPARATUS FOR 3D DISPLAY AND ANALYSIS OF DISPARATE DATA

(71) Applicant: Bitvore Corporation, Los Angeles, CA (US)

(72) Inventors: Carl Mandel, Los Angeles, CA (US); David Mandel, Los Angeles, CA (US); Brian Fudge, Los Angeles, CA (US); Lew Roth, Los Angeles, CA (US); Gregory Bolcer, Los Angeles, CA (US); Gerry Deckert, Los Angeles, CA (US)

(73) Assignee: Bitvore Corp., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,634

(22) Filed: Sep. 18, 2013

(65) Prior Publication Data

US 2014/0115541 A1 Apr. 24, 2014

Related U.S. Application Data

(63) Continuation of application No. 13/365,193, filed on Feb. 2, 2012, now Pat. No. 8,626,750, which is a continuation-in-part of application No. 13/016,929, filed on Jan. 28, 2011, now Pat. No. 8,694,490.

(51) Int. Cl.
| | |
|---|---|
| *G06F 17/30* | (2006.01) |
| *G06F 3/0482* | (2013.01) |
| *G06F 3/0481* | (2013.01) |
| *G06T 11/20* | (2006.01) |

(52) U.S. Cl.
CPC ........ *G06F 3/0482* (2013.01); *G06F 17/30713* (2013.01); *G06F 17/30994* (2013.01); *G06F 17/30716* (2013.01); *G06F 17/30719* (2013.01); *G06F 3/04815* (2013.01); *G06T 11/206* (2013.01)
USPC ............................ 707/722; 707/713; 715/781

(58) Field of Classification Search
USPC .................. 707/713, 722, 736, 737; 715/781
See application file for complete search history.

(56) References Cited

U.S. PATENT DOCUMENTS

| | | | |
|---|---|---|---|
| 6,629,102 B1 * | 9/2003 | Malloy et al. ......................... 1/1 |
| 8,346,681 B2 * | 1/2013 | Lauritsen ........................ 706/11 |
| 2009/0031245 A1 * | 1/2009 | Brezina et al. ................ 715/781 |

* cited by examiner

*Primary Examiner* — Monica Pyo
(74) *Attorney, Agent, or Firm* — McAndrews, Held & Malloy, Ltd.

(57) ABSTRACT

The system provides a method and apparatus for sorting and displaying collections of communications. These communications can be a single type or multiple types of data and may come from email systems, bulletin boards, text messages, Facebook and Twitter postings and comments, financial transactions, travel itineraries or any other type of communications. The communications represented by the system can be electronic or physical as desired. The system can also present forwarded, copied, replied, or other types of communications. In one embodiment, the system provides a Universe View of a set of communications. The Universe View, in one embodiment, is a three dimensional representation of a plurality of cubes. Each cube represents a subset of a collection of communications. Each cube can be color coded or shaded to represent a dominant theme of the contents of the communications represented by the cube.

16 Claims, 40 Drawing Sheets

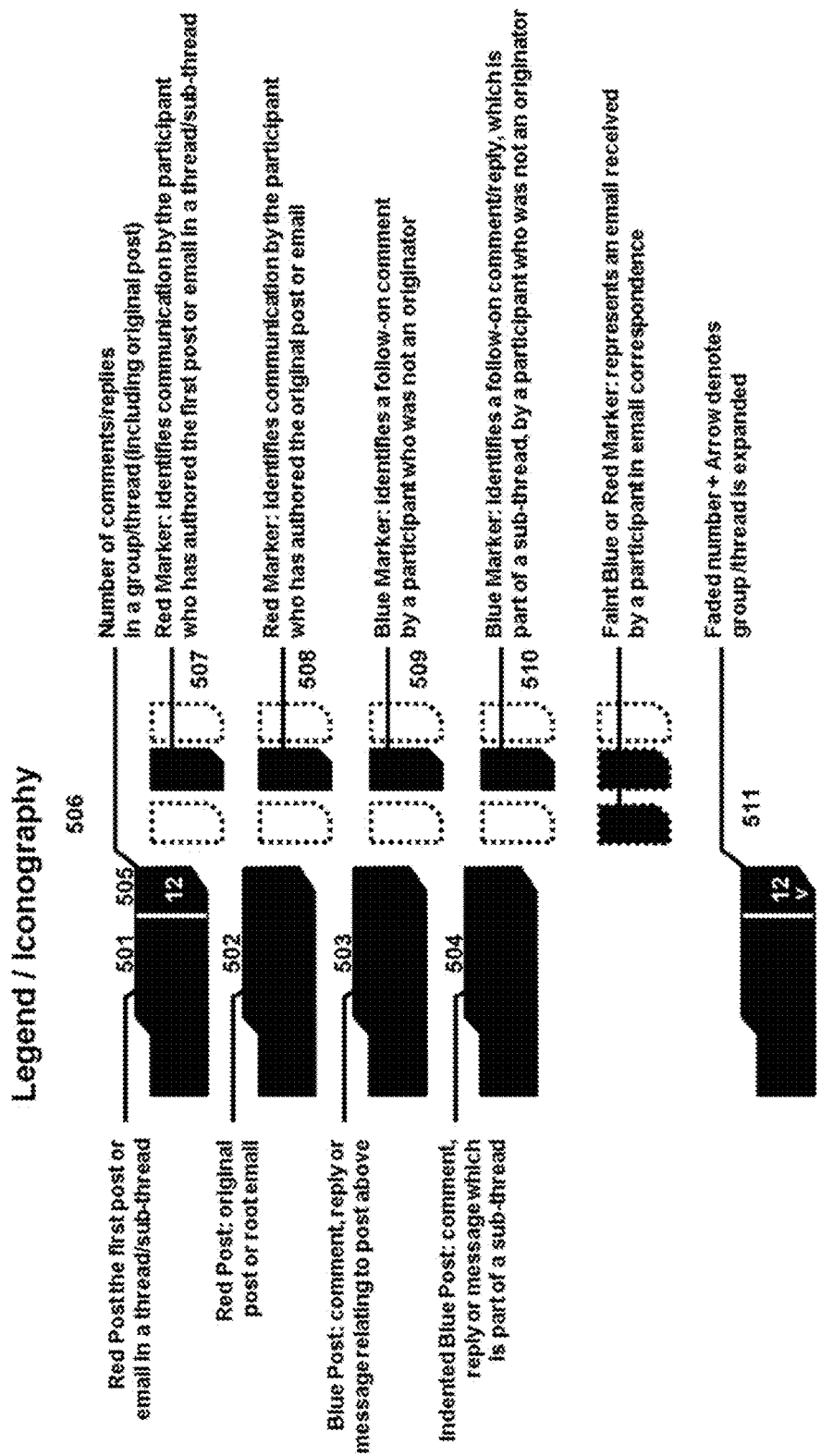

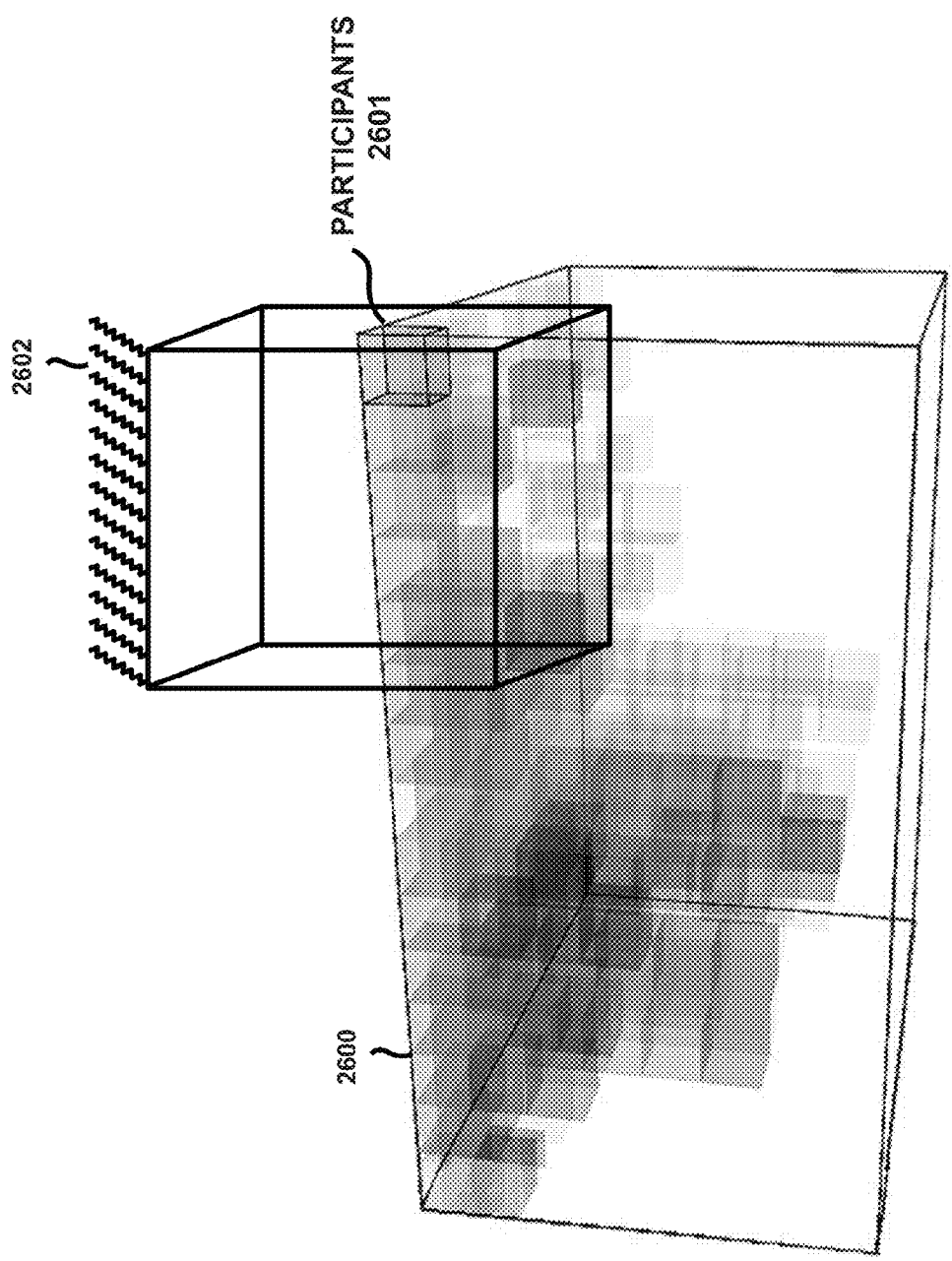

METHOD AND APPARATUS FOR 3D DISPLAY AND ANALYSIS OF DISPARATE DATA

This patent application is a continuation of U.S. application Ser. No. 13/365,193, filed Feb. 2, 2012, which is a continuation-in-part of U.S. patent application Ser. No. 13/016,929 filed on Jan. 28, 2011. The above-referenced United States patent applications are all incorporated by reference herein in their entirety.

BACKGROUND OF THE INVENTION

As electronic communication has supplemented and replaced prior communication techniques its importance as evidence in transactions has grown. Particularly in litigation and compliance, due in part to the impact of Sarbanes-Oxley and other corporate governance requirements, the preservation and production of email is required in every jurisdiction.

The Federal Rules of Civil Procedure have been expanded to cover electronically stored information (ESI) including emails and other types of electronic communication. This type of information must be preserved and produced in a controversy as well as in the normal course of corporate governance and compliance. A difficulty in producing electronic communications is the need to produce all the electronic communications required and only the electronic communications that are required of a party to produce. Failure to produce all requested electronic communications can result in potential loss of rights and/or penalties from governing bodies such as the SEC. Producing more electronic communications than are required can breach confidentiality and put a litigant or company in the position of revealing data that would otherwise have remained confidential.

In addition to mandated production of communications, there are other reasons to search, sort, manipulate, and view communications databases. Information and trends can be gleaned from collections of communications and messages. This applies to collections of emails, bulletin board postings, SMS messages, Facebook postings and comments, Twitter feeds, and other communications.

The prior art does not have suitable systems for viewing large collections of communications and presenting them in a way that can be visually useful.

SUMMARY OF THE SYSTEM

The system provides a method and apparatus for sorting, analyzing, and displaying collections of communications or other datasets. These datasets can be exclusively or collectively from email systems, bulletin boards, text messages, social networks including Facebook and Twitter, financial transactions, travel itineraries or any other type of communications or datasets. The communications or datasets represented by the system can be electronic or physical as desired. The system can also present forwarded, copied, replied, or other types of communications. In one embodiment, the system provides a Universe View of a set of communications. The Universe View, in one embodiment, is a three dimensional representation of a plurality of cubes. Each cube represents a subset of a collection of communications, which may be from a single communication system or datasets, or from multiple communication systems or datasets. Each cube can be color-coded or shaded to represent a dominant theme of the contents of the communications represented by the cube. Each cube can itself be represented by a plurality of sub-cubes, each representing a smaller subset of communications. The user can zoom into any cube of the Universe View so that it expands to represent a collection of its sub-cubes. Each sub-cube can also be color-coded to represent themes related to the data collection represented by the sub-cube. The drilling down to smaller sub-cubes of data collections can continue to as many levels as desired.

In another embodiment, the system can display data in a circle presentation where each circle can represent a participant and the relative size of a participant's circle can represent the amount of activity of the participant. The circles may overlap to indicate certain relationships or communications between the participants.

In another embodiment, the system provides a "slab" view of portions of data displayed in the universe cube view. The system allows other views of the slab to be displayed and allows the slab to be moved along any of the universe cube axes.

In another embodiment, a sub region of a Universe View can be expanded in situ at the universe cube in any of a plurality of presentations, including a larger cube, a slice, a slab, a text cloud, and the like.

In another embodiment, data is presented in a timeline based interface where one region represents a timeline and selected portions of the timeline can be presented in any of a plurality of formats in a second region of the interface.

In another embodiment, the system allows sentiment of communications to be represented by color coding, which can reveal communications and relationships of interest. In another embodiment, the system utilizes snap-to hotkeys to allow switching between views and parameters to aid in the presentation of data.

BRIEF DESCRIPTION OF THE DRAWINGS

FIG. 5A is a color version of an example the iconography used to represent communications in one embodiment of the system.

FIG. 10 illustrates the display of tag clouds with selected message threads.

FIG. 11 illustrates an embodiment that includes a scrollable list of tag clouds.

FIG. 26 is an example of an in situ cube expansion in an embodiment of the system.

DETAILED DESCRIPTION OF THE SYSTEM

The system enables an analyst or user to visualize, navigate, manipulate and dissect multiple layers of communications and activities to reveal patterns, correlations, and information across communication threads or other datasets, no matter what the source or sources of the communications or datasets. The system automates construction of threads and sub-threads from raw data. The system permits tracking any activity, whether it is a form of communication or whether it is an event or any other type of data. For example, the system can track the propagation of an infectious disease across the U.S. and compare that to time and socioeconomic factors (note that the dimensions do not have to include communications). The database schema can be used for ingesting and indexing any data source that requires visualization of more than two dimensions.

Figure 1:
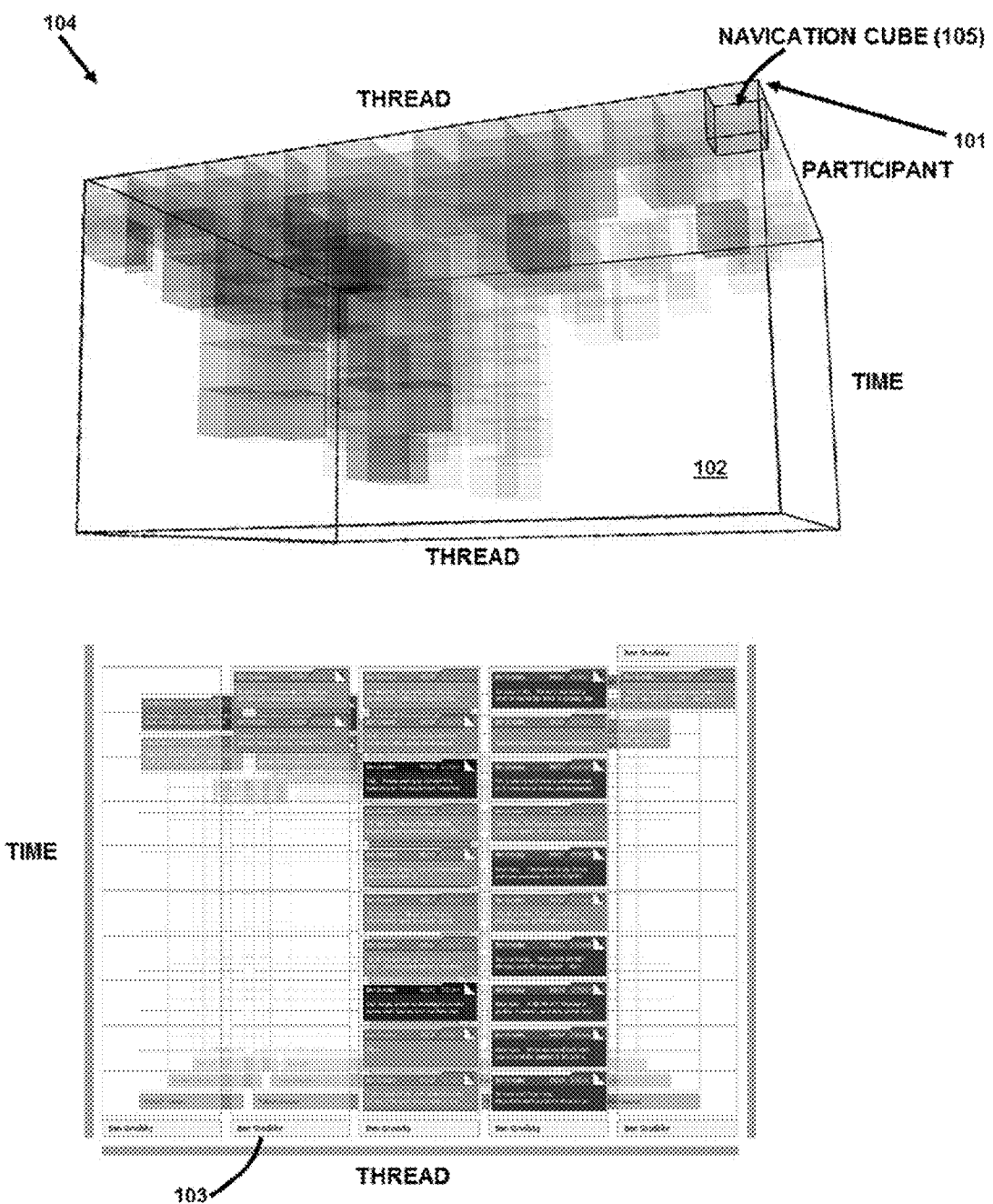
FIG. 1 is an example of an embodiment of the Universe View of the communication system or datasets.

One of the ways that the system enables the revelation of patterns and correlations is the plurality of methods of displaying data that are available in the system. One such method of display is referred to herein as the "Universe View". FIG. 1 illustrates an embodiment of the system (104). The system presents a Universe View of data in a graphically meaningful way that allows a user to understand relationships and the nature of data being observed. The Universe View is a graphical representation a database of communications or of the results of searching a database of communications. The user can search via any number of parameters and/or conditions, such as To:, From:, Date Range, Subject, Keywords, Attachments Y/N, Attachment Type, Originating or Root Participants, Threads, Dates, etc. After choosing search parameters and/or conditions to apply to a database of communications, the user is presented with a. Universe View representing the population of communications that satisfy the search.

In one embodiment the system defines an origin 101 that is at the top, front, and right of a cube space. It could be considered the 0,0,0 point of an xyz axis. In one embodiment of the system, the x axis represents threads, the y axis represents participants and the z axis represents time units. In one embodiment, such as cube 102, the Universe View comprises a large cube having dimensions of 125 threads×125 participants×125 time units. Each sub-cube, such as cube 105, 203 or 303, represents 25 threads×25 participants×25 time units. If desired, another sub-cube, such as cube 304, could represent 5 threads×5 participants×5 time units.

In one embodiment, the system can display everything in the Universe View in a wire frame representation except the navigation cube. This view can be selected at the user's discretion.

It should be noted that the time units, if linear, may result in gaps and non¬ uniform distribution of messages or other data points in the cubes. In other words, each cube does not necessarily have the same concentration of data. Alternatively, time units may be chosen to be sequential, but not linear. In this case, messages are shown one after the other chronologically (sequentially), but not with a linear scale of time.

The system is not limited to these example dimensions. The system could use any characteristics for the axes and the size of the cubes may be any as desired without departing from the scope or spirit of the system.

In the embodiment of FIG. 1, the data is presented such that the negative x, y, and z axes are used. It should be understood, that the system may use the positive x, y, and z axes as desired, or any combination of the positive and negative axes without departing from the scope and spirit of the system.

The system can be used with databases of any size. To aid in representing the data, the system can define hierarchical levels of the data so that the user can drill down to lower and lower levels to where each cube represents a successively smaller number communications until individual communications can be perceived. The number of levels depends on the amount of data retrieved and the preferred settings of the user.

Returning to the Universe View of FIG. 1, the user can refine the search by constraining any of the parameters and/or conditions in the original search or by adding additional parameters and/or conditions as desired. The user can select and deselect any of the displayed cubes as desired. The user may view the texts of the messages or postings within the threads of communications in selected cube(s) as desired.

The system includes a color-coding system where the color of each cube represents the dominant presence of a data parameter selected by the user. Consider the case where the communications are e-mails and the color-coding is such that messages from participants that initiate threads (Originating Participants) are coded red and messages from Active Participants are blue. If most of the messages in a cube or sub-cube region are emails of Originating Participants, then it's coded dark red. If most of the messages within a cube or sub-cube region are emails from Active Participants in the email string (Active Participants are defiled as those participants in the tread that are sending reply emails, but they are not the ones initiating emails), then the cube is coded dark blue. If there is no email activity within that small cube, it's coded white so the user knows they can ignore it.

The user's screen is split into two halves: Universe View (104) on the left and Portal View (103) on the right. As you navigate from region to region through the Universe View on the left using the Navigation Cube, the corresponding Portal View for that region appears on the right. The Portal View is continuously updated and shows the message or postings at that region of space within the Universe View. The Portal View is higher resolution, so you can see the individual threads, messages, or postings. In cases where the Universe View contains messages or threads from multiple communication systems, the Portal View may contain a variety of threads, messages or postings, such as a mix of email threads, and the postings and comments comprising Facebook and Twitter threads.

The system can be used with any data set, such as an email database as noted above, or for example the messages from one or more bulletin boards, or postings and comments from social network threads such as Facebook and Twitter. In an embodiment using bulletin boards, the user could set the resolutions/definitions of the smaller sub-cubes within the Universe View according to search terms (eg., define the smaller sub-cubes by assigning an Alert trigger term to each small cube in the Universe View). Each sub-cube represents bulletin boards where one or more of the trigger terms is predominant. Communications from each of these sources may be processed as a batch, or in a continuous manner as data arrives from each source, such as live monitoring of communications. Communications may also arrive multiple times or out-of-order, as they are placed in order and de-duplicated by the system.

In another application, the user can set up search criterion such as Key Participants, Alert Triggers, etc. to bring up bulletin board forums or threads of interest; remove any to be ignored, and display the results in a Universe View. The cubes are color-coded according to the bulletin boards threads they contain; e.g. red cubes contain threads with mostly Key Participants (linear or deconstructed bulletin boards whose participants that have automatically been designated Key Participants because their postings have triggered Alerts; some regions are the regions where the Key Participants are most frequently making postings containing Alert triggers; so, the areas are those bulletin board forums/threads where those participants are most actively using the Alert triggers (Sentiment, Keywords, etc.) in their posts.

In one embodiment, if a participant that is currently not a Key Participant is designated as a key participant, then the system pivots on the search. (i.e. if the system is set to find other postings and/or users using phrasing that ties back to a Key Participant, then system would pivot on the search and find those postings).

Figure 2:
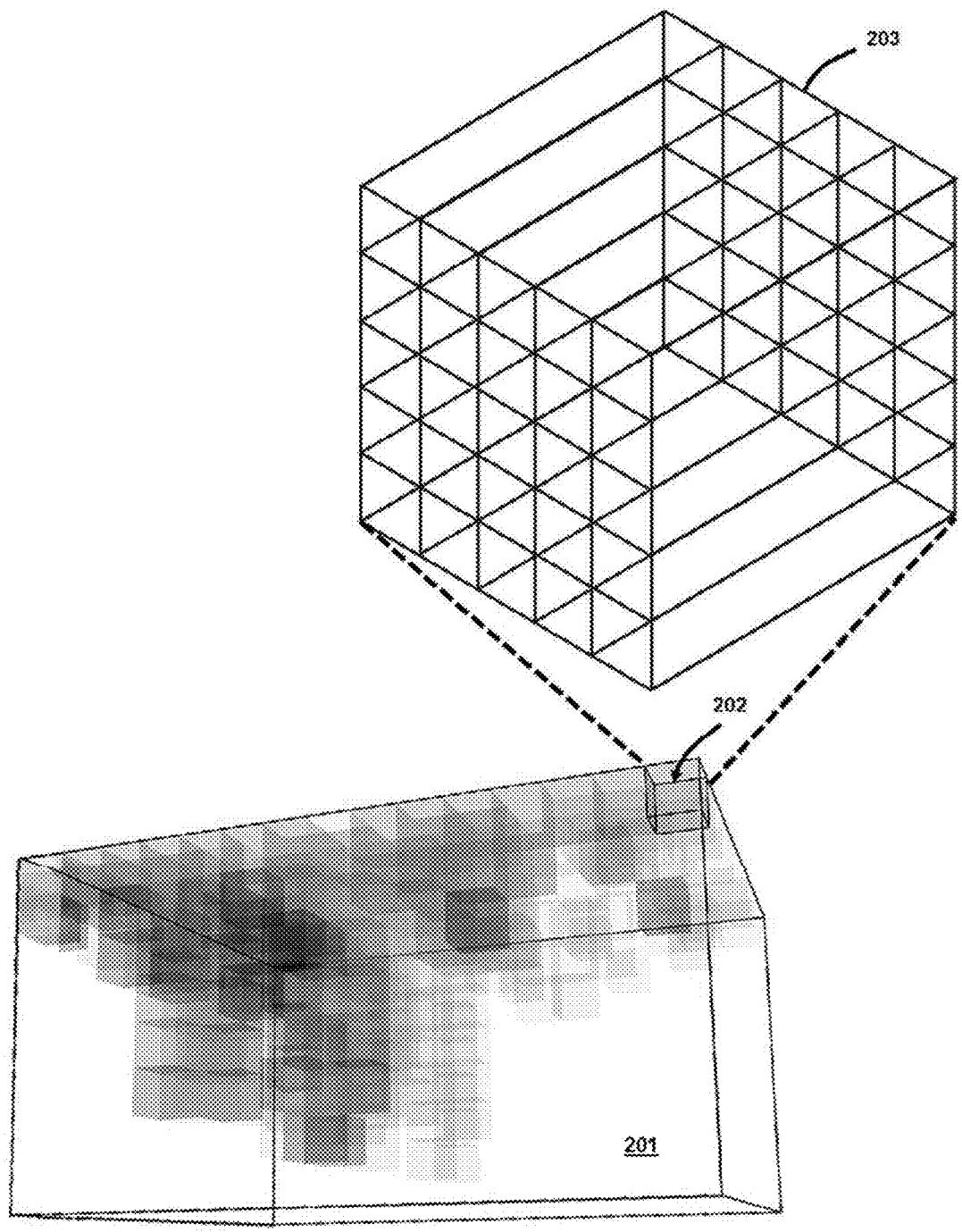
FIG. 2 is an example of a zoomed in view of FIG. 1.

FIG. 2 illustrates a perspective view of a universe cube 201 with a sub-cube 202 selected and shown enlarged 203 on the top right. The user is free to use a mouse, for example, or touch screen, or other selecting method or device (including but not limited to the screen or input device on PDAs and smartphones, tablet PCs, iPads), to select any of the sub-cubes within Universe View 201. When a sub-cube such as 202 is selected, it is shown enlarged as at 203. The sub-cube can be viewed in a number of different ways as described in FIGS. 3 and 4.

Figure 3:
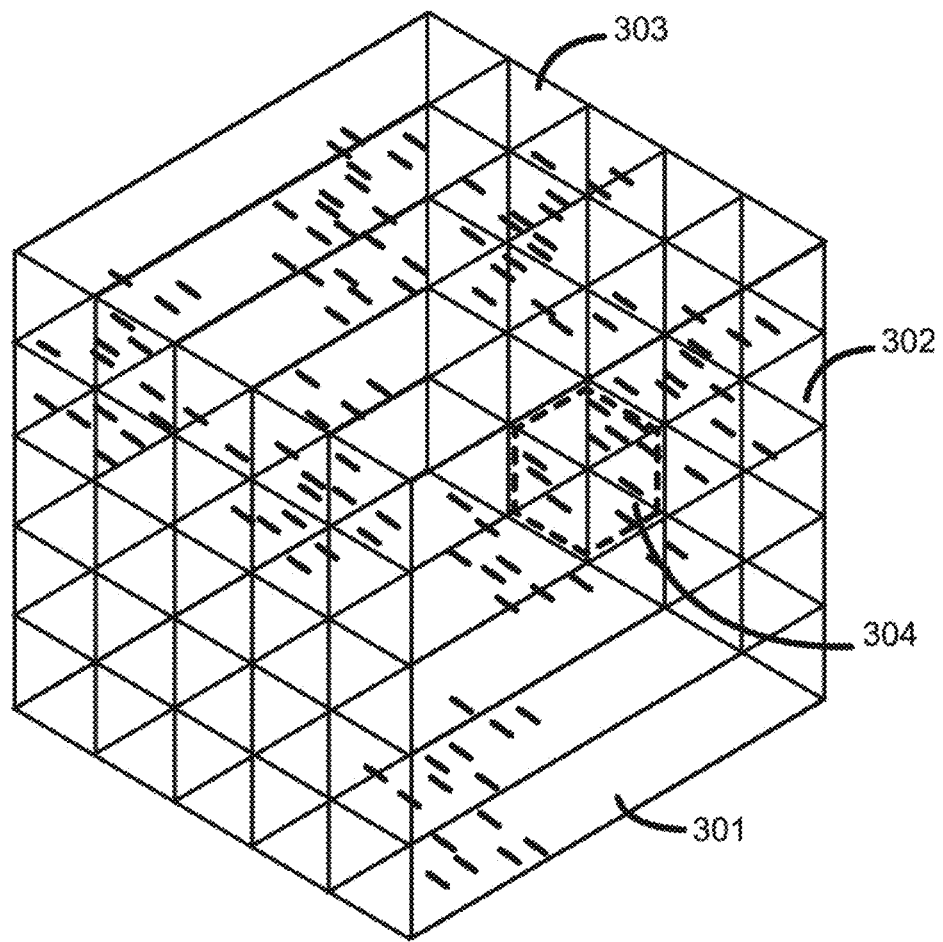
FIG. 3 is another embodiment of the zoomed view of FIG. 2.

Referring now to FIG. 3, the sub-cube 202 is shown in another format as enlarged cube 303. Cube 303 includes representations of individual messages, threads, postings, or other data content of the database being represented. As indicated above, the data content may be one or a mixture of all these different kinds of data in the database. These graphical representations such as 301 and 302 may be similar to those described in pending patent application Ser. No. 12/835,724 entitled "RELATIONAL PRESENTATION OF COMMUNICATIONS AND APPLICATION FOR TRANSACTION ANALYSIS" filed on Jul. 13, 2010 and incorporated by reference herein in its entirety.

Figure 4:
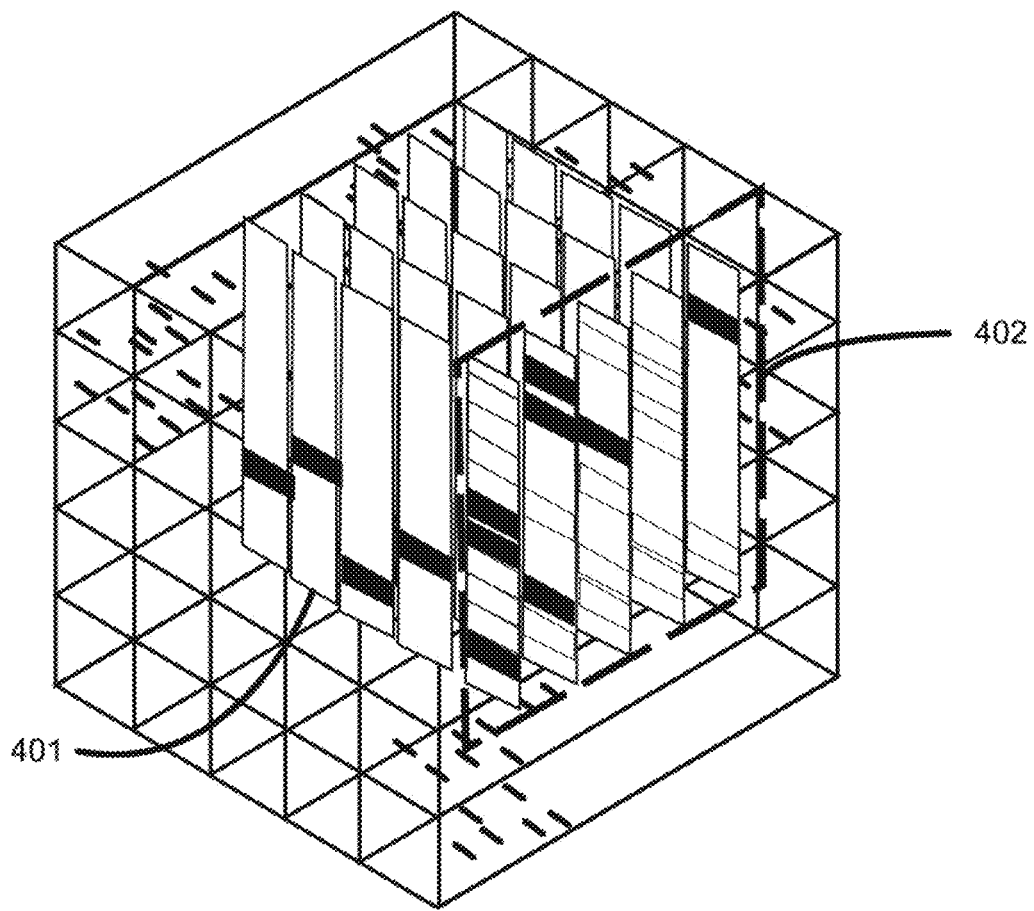
FIG. 4 is an expanded view of sub-cube of FIG. 2.

The cube 303 can be further drilled down by the user to additional sub-cubes such as cube 304. FIG. 4 illustrates the system after sub-cube 304 has been selected. The sub-sub-cube 304 is shown in red highlight within sub-cube 303. The enlarged view 401 shows the 5×5×5 dimensions of the sub-sub-cube and also shows a three dimensional representation of the postings within the sub-sub-cube as represented by planes of data such as 402. These planes of data are described in pending patent application Ser. No. 12/836,446 entitled "PRESENTATION AND SORTING OF EMAIL" filed on Jul. 14, 2010 and incorporated by reference herein in its entirety.

Iconograpy

FIGS. 5-8 illustrate an embodiment of display and iconography of communications. The example of these figures can be applied to the dedicated illustration of just one type of communications, (e.g. emails, or BBS posts, or the like) or it may illustrate related or unrelated messages of more than one origin or type, such as emails with phone calls and texts and BBS postings. Communications can also be considered to be related if one posting quotes another or contains similar words and/or concepts, regardless of the senders and receivers. The system will link the postings and represent that linkage in the graphical iconography illustrated in FIGS. 5-8 or in some other graphical and/or iconographic manner.

Figure 5B:
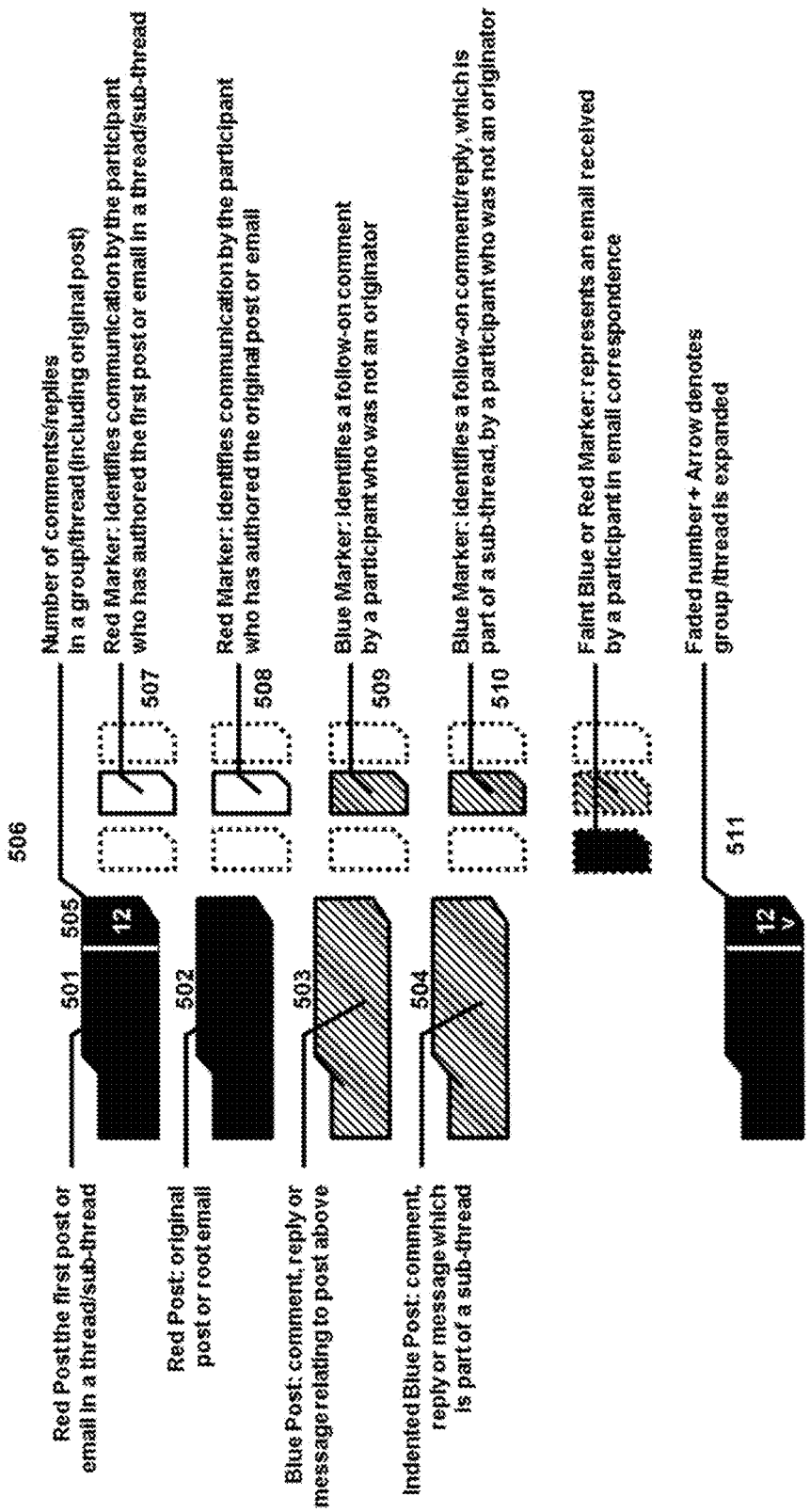
FIG. 5B is a black and white version of an example the iconography used to represent communications in one embodiment of the system.

Referring to FIGS. 5A and 5B, the system uses a consistent iconography regardless of the source of the communication, email, message, or posting. The original post, email, Twitter post, Facebook post, bulletin board posting, or other communication is represented by a red indicator 501. The original post 501 includes a blue or red indicator 505 that represents the number of comments or replies in a group/thread (including the original post). This is useful for an analyst to know the level of activity that a post generates.

A blue post 503 below the original post 501 represents a comment, reply, or message relating to the original post 501. Indented posts, such as post 504, represent a comment, reply, or message which is part of a sub-thread.

Section 506 represents that a participant has received an email communication (501, 502, 503, or 504) from another participant. A red marker 507 represents a communication by the participant who authored the original post 501. A blue marker 509 identifies a follow-on comment by a participant who was not an originator. A blue marker 510 on the same line as an indented marker 504 represents a follow-on comment or reply which is part of a sub-thread and not from the originator.

Marker 510 is a follow-on comment. The default view is that all threads are expanded and all messages/postings are displayed. In an alternate treatment of threads/sub-threads, as soon as user clicks on any message/posting in any of the expanded threads/sub-threads, then all messages/postings that are not part of that thread/sub-thread go medium-gray (get "grayed-out"). Icon 511 shows a faded number plus an arrow that indicates that a group or thread is expanded.

Figure 6A:
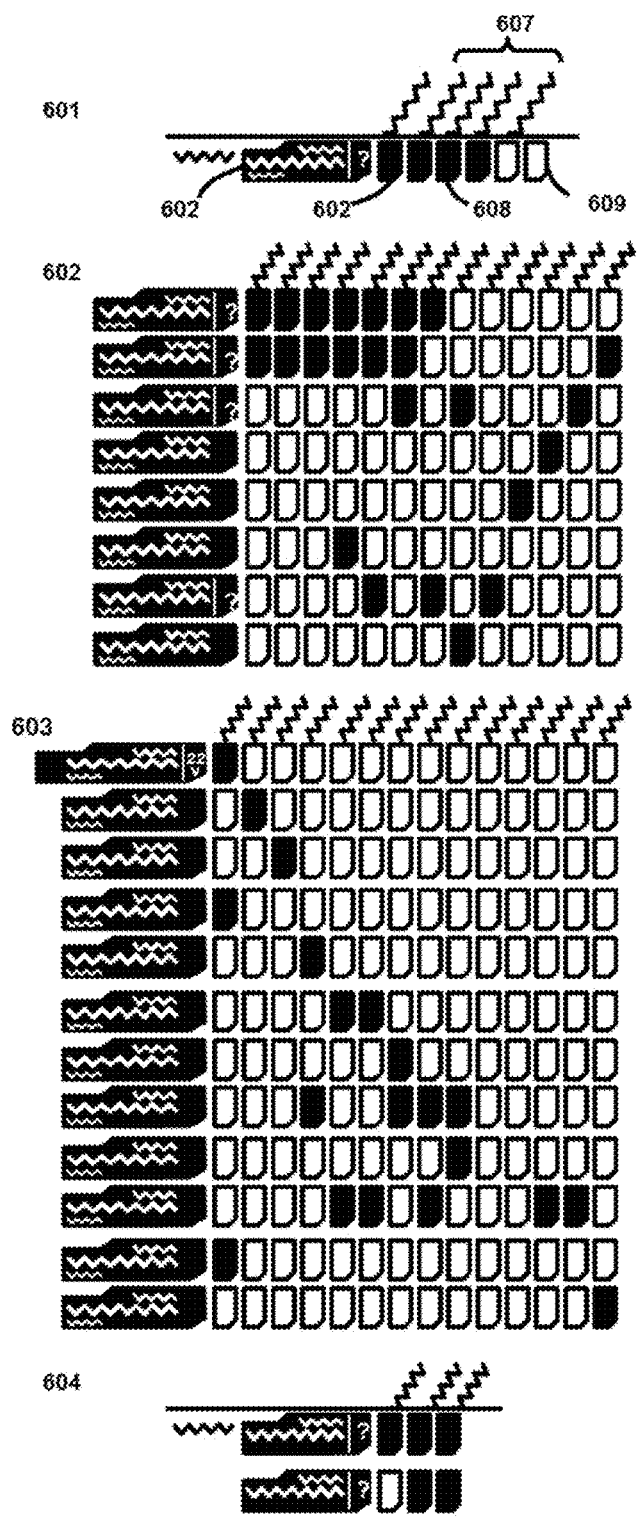
FIG. 6A is a color version of an example of representing threads in an embodiment of the system.
Figure 6B:
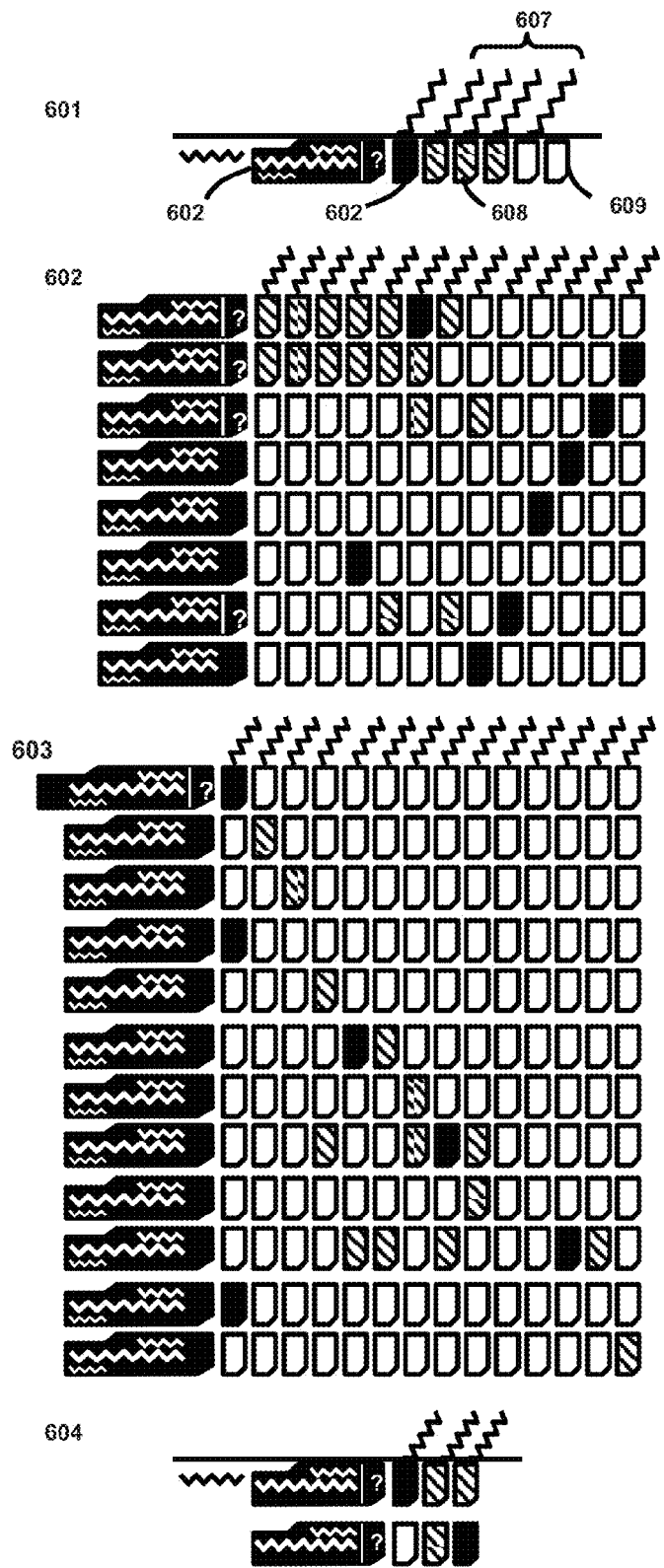
FIG. 6B is a black and white version of an example of representing threads in an embodiment of the system.

FIGS. 6A and 6B show examples from email 601, Facebook 602, a bulletin board 603, and a Twitter conversation 604. The iconography of FIGS. 5A and 5B is applied here in this example. Referring first to email threads 601, it can be seen that there is an original email 605 with an indicator of 6 that represents email messages in that thread, including the originating emails and replies. To the right of email 605 are markers that represent further activity by the original poster (in red 606) and repliers 607 and 608 in blue, and light markers 609 representing replies received by participants. In one embodiment, the email addresses of the participants are displayed above the markers in the top row. In an alternate embodiment, rolling a cursor over each marker causes its name to be displayed to the user of the system. The vertical axis represents relative time in the embodiment, so that markers to that follow a messages are later messages than those to above. The system reflects the fact that an original post may have a related second post. Then comments to the second post might actually come before comments to the first post. The system takes this into account in its presentation iconography. Similar application of the iconography is made for other communication systems (examples shown in 602 (Facebook), 603 (bulletin board), 604 (Twitter)).

Figure 10:
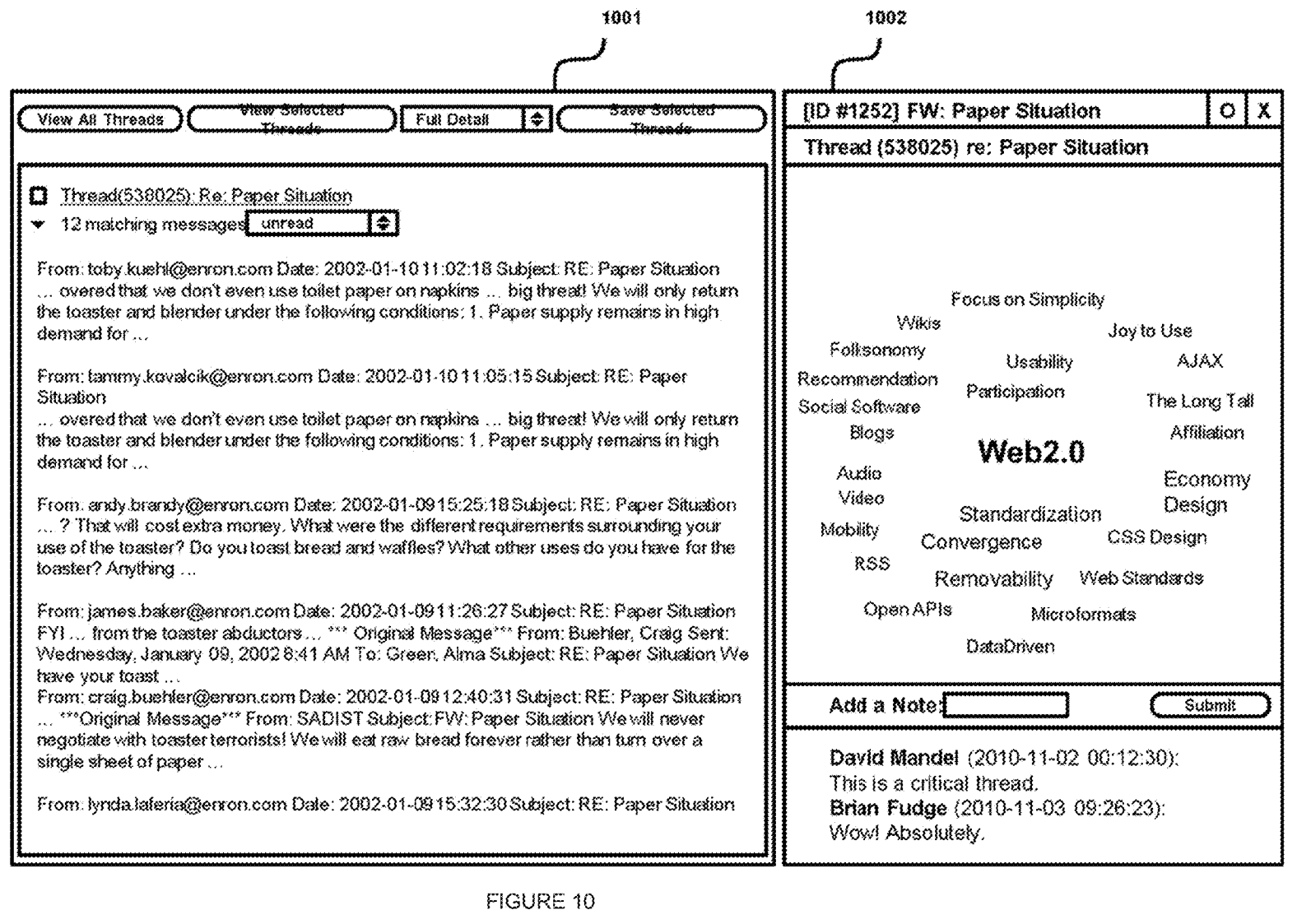

The approach of FIGS. 6 and 7 may be combined with the Universe View of FIG. 1. The system may present search results as thread lists as shown in FIG. 10 (1001), as the Universe View of cubes as shown in the left hand side of FIG. 1, or in a combination of the Universe View of FIG. 1 and the thread list of FIG. 10 (1001). The system can display side by side or on separate displays when they are available. As the use zooms in or manipulates the cube, the thread lists displayed to the right will change accordingly.

In one embodiment, the system indicates whether a message or thread has been tagged with an object flag (unread, privileged, confidential, etc.) or a issue bucket/factset. This indicator can appear in the sidebar message viewer and the 2d/3d views. Examples of some icons that could be used include:

Privileged (light black background)
Confidential (padlock icon)
Pertinent (bolded text in message)
Further review (question mark on message icon)
Ignore (light grey background/dark grey text)
Boost/suppress in search results only (thumb up/thumb down icon)

Figure 7A:
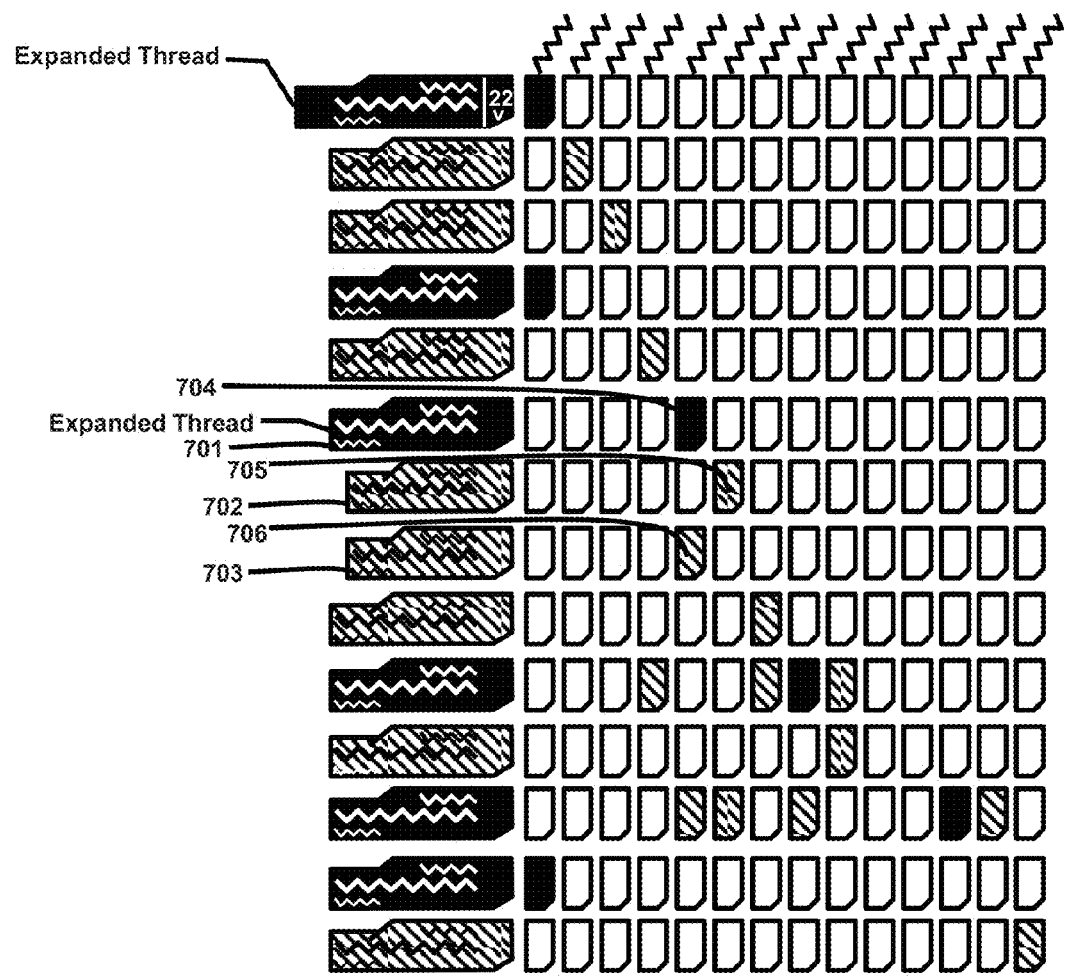
FIG. 7A is a color version of an example of an expanded thread of the embodiment of FIG. 5A.
Figure 7B:
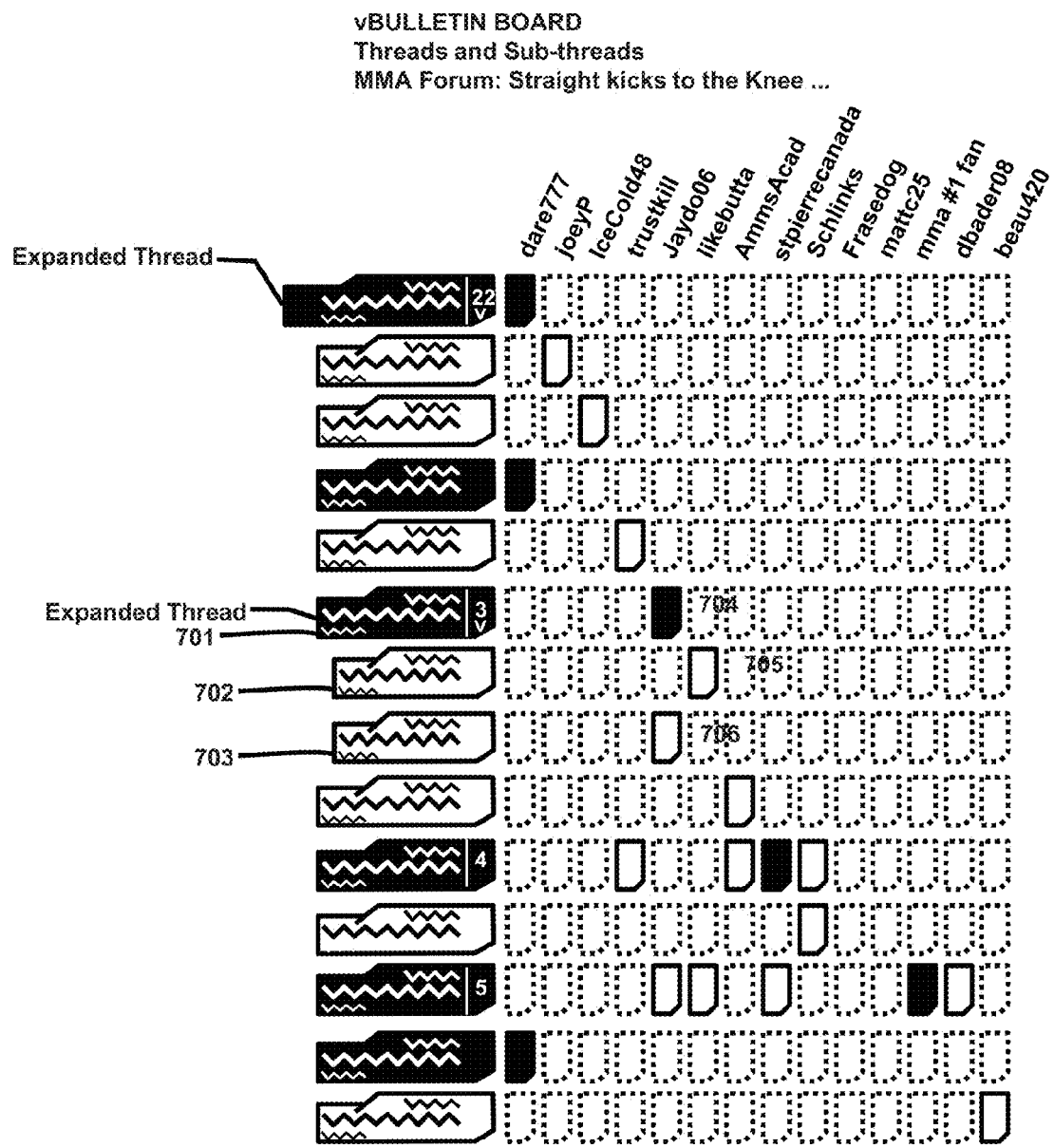
FIG. 7B is a black and white version of an example of an expanded thread of the embodiment of FIG. 5B.

FIGS. 7A and 7B illustrates an embodiments of the bulletin board 603 of FIGS. 6A and 6B where a thread is expanded. In the example shown, a non-originating post 701 is expanded. This reply post had three replies (counting the original posting) and these are shown in the left hand column at 701, 702, and 703 and shown as markers at 704, 705 and 706.

Figure 8:
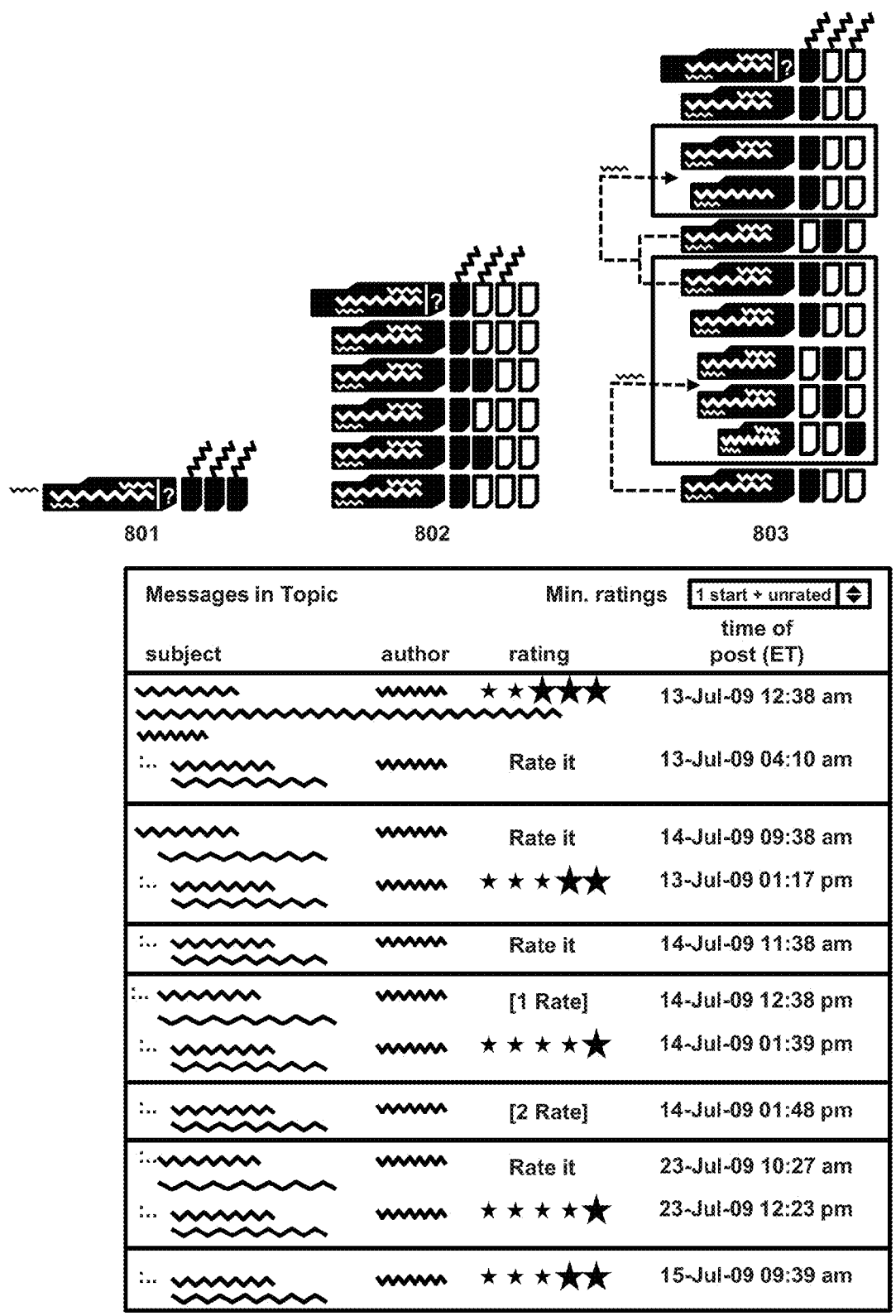
FIG. 8 is an example of threads and sub-threads expanded.

FIG. 8 is an alternate embodiment of an expanded view that also includes the text of messages in the selected group of interest. At 801 we see an originating post that includes an indicator of the total number of messages in the group/thread, including replies, postings, and other related communications. At 802 the first thread is expanded. At 803 all threads and sub-threads are expanded. At 804 the messages themselves are visible and correspond to the message indicators of 803.

An advantage of having the consistent iconography for messages and postings from multiple sources is the ability to then translate those communications to the Universe View and have the representations be consistent in each cube of the Universe View. By using a uniform approach across all of these ways of communicating, it allows you to take all 2D visualizations and layer them together in one 3-dimensional visualization. This provides a way of visualizing all the different ways of communicating by using one approach that will work for all of them. There are similarities, but each of the ways of communicating has different characteristics. Email has a sender that sends a message to one or more specific people, who then respond. Bulletin Board posts are a broadcast to everyone, and any response/comment posting is also broadcast to everyone; bulletin boards have a certain format and ordering of posts in threads and sub-threads. Facebook has a mix of postings that are broadcast to everyone, and comments that are also broadcast to everyone; it also has a specific ordering for comments/posts, and also has the capability of direct messages between users and "via-ing" a post from another users profile (Facebook equivalent to re-Tweeting). Twitter has posting that are broadcast to everyone, and direct Tweets that are broadcast to a subset, etc.

When data is displayed in the Universe View, all threads and sub-threads are expanded.—it's okay if messages/postings for the threads/sub-threads in the different data domains get out of order in time (mix into each other) when you expand sub-threads (so they are in correct chronological order), because when you put them all up into the UV you're looking for relationships between threads/slices of the UV cube (looking for "inter-thread" relationships (it is permissible if messages are out of order on an "intra-thread" basis))—when the user switches to 2D GUI for any of the threads, the sub-threads will be correct again.

In an alternate usage, the data content may be outside of the field of communications. For example, the source data may be individuals, hospitals, and cities experiencing an outbreak of an infectious epidemic. In this case, the representation may be of the propagation of the infection throughout the population of individuals, hospitals, or cities. Or, the source data may be different users of a communication system expressing and re-expressing/re-interpreting an idea or concept. In this case, the representation will be of the propagation of a "meme" (concept or idea) through the system.

Ordering of Participants and/or Threads

In a two-dimensional visualization involving communications data (Participant×Thread), the system orders the participants so that the most important information is presented to the user first. As shown in the flow diagram of FIG. 18, the system selects a thread at step 1801. At step 1802 the profile builder is used to determine if the same entity has multiple communication addresses or handles (i.e. email address(es), Facebook handle, Twitter handle, etc.). If it does, communications using the different communication addresses/handles are combined into the same column.

Next, at step 1803 a score is assigned to each profile based on the number and type of communications. An Originating Participant, in the default system setting, always receives the highest score and is placed in the leftmost position. The remaining participants are ordered based on the number of messages/comments (responses) they created in the thread at step 1804

Once all Active Participants have been placed in columns in the visualization, Passive Participants (those Participants that did not send any emails or post any postings/comments) are placed at step 1805. Passive Participants are ordered based on the number of messages they received in the thread. At step 1806 the 2D visualization is presented.

Figures 18, 19:
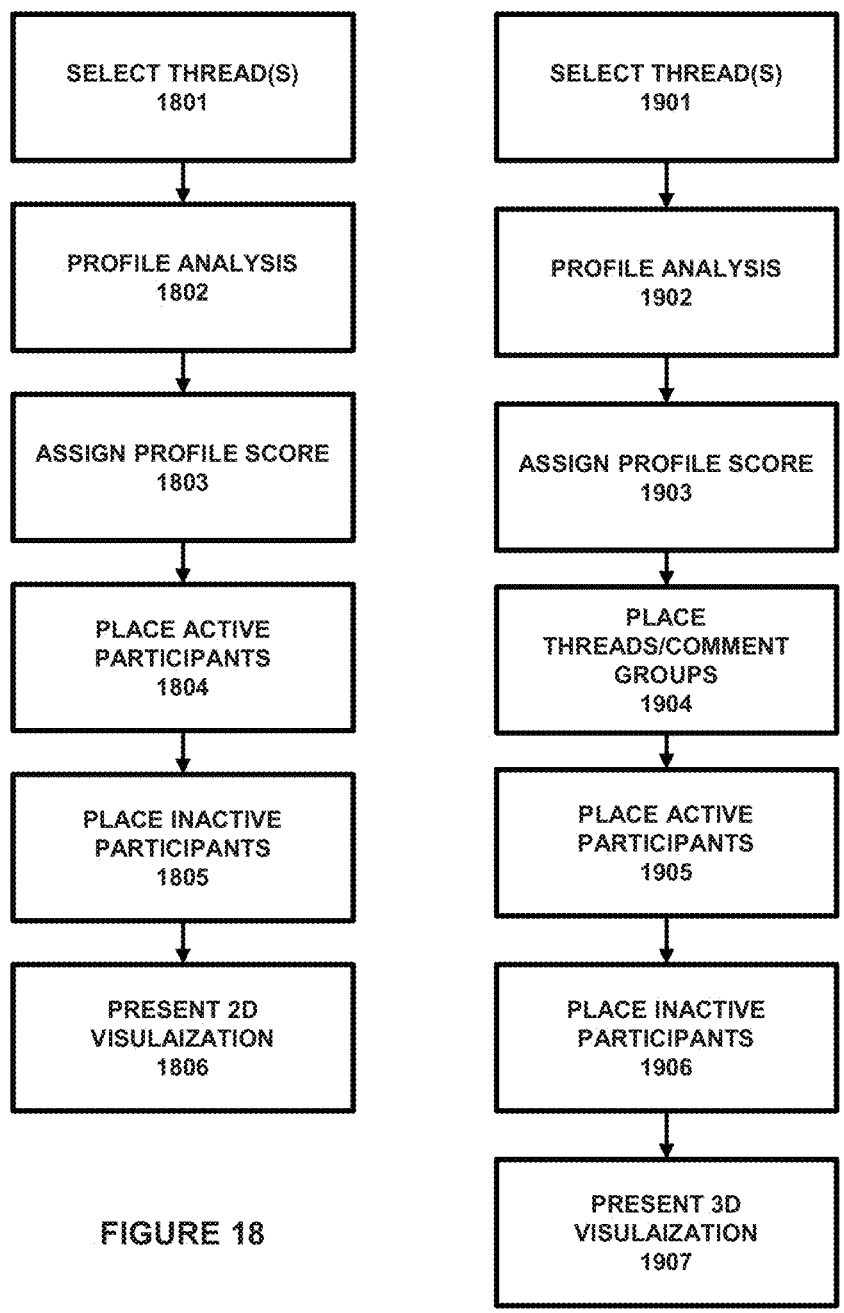
FIG. 18 is a flow diagram illustrating an embodiment of the system for ordering threads.
FIG. 19 is a flow diagram illustrating the operation of an embodiment of the system.

In a three-dimensional visualization ordering involving communications data as described in the flow diagram of FIG. 19, the participants, threads and/or posting comments grouping of step 1901 are again ordered so that the most important information is presented to the user first. As with 2D visualizations, a profile analysis, step 1902, is done and profile scores are assigned at step 1903.

Threads and/or posting/comments groups may be ordered automatically or by the user. If they are ordered automatically, the system assigns a relevance score based on the type of search being done and the number of matches. A keyword search could order threads based on a relevance such as the number of messages containing the keyword divided by the total number of messages in the thread. A fuzzy search could order threads based on a relevance indicating the closeness to the word searched for. The thread may also be ordered using the thread-ranking algorithm described below in this document (see "Thread Ranking" below).

The analyst may also select threads from a clipboard representing a number of unrelated searches. In this case, relevance ordering is not present but may be implied by the analyst tagging threads with flags such as: "important", "not important". In these cases an automatic grouping by communication domain may be placed on the threads: e-mail group, Twitter group, Facebook group, etc.

After threads and/or posting comments groups have been ordered at step 1904, the participants are ordered. In a three-dimensional visualization the participant ordering is slightly more complicated than the two-dimensional case described above. The score for each participant is calculated over all threads that the participant is a member of. This has the effect of locating the most important information to the front and right of a three-dimensional cube. This algorithm may also cause unexpected ordering of participants. A participant that is completely passive in many threads may actually be placed in a high ranking position due to origination and response activity in many other threads.

An analyst can always change the order of the participants or threads, regardless of the visualization selected. Additional ordering criteria may include: order by organization chart, order by global importance of participant, order by absolute length of time of thread, order by number of messages in thread, order by thread ranking (defined below), etc. The Active and Passive Participants are ordered at steps 1905 and 1906, and the 3d visualization is presented at step 1907.

Tag Clouds

Tag clouds are a way of visually representing the frequency of terms, words, concepts, or objects in a document or database. There are several different formats for tag clouds, but one format that can be used effectively in this system is the tag cloud format where the most common terms, words, concepts, or objects appear in the center, and then the levels of frequency decrease in concentric circles as you go outwards away from the center.

Instead of just gradating the different terms, words or objects in the tag clouds according to frequency, the user may apply different criteria to the tag cloud visualization, such that terms or words may appear larger or smaller according to certain user-specified boosting criteria. For example, nouns or locations could be set to appear larger than adjectives. Additionally, using proximity analysis, where the user specifies that certain words appearing in the same phrase are more relevant than if they appear in separate phrases, a boosting co-efficient can be assigned to certain phrases or word groupings.

In one embodiment of the system, when the user is viewing a threadlist screen containing a list of communication threads in the database or search results, the user has the option of showing a tag cloud in the message view window, instead of the default view which shows the text of the selected message/posting in the message view window. When the user clicks on a thread header for a communication thread listed in the thread listing screen, a tag cloud representing the entire thread is shown in the message view window. When the user mouse-clicks or otherwise selects a message in the thread, the tag cloud is shown for the selected message. The user can also set the application preferences so that when a thread is shown in the thread list screen with the "Maximum detail" option selected via a pulldown menu, a tag cloud for each message is shown instead of the text or first few lines of text in the message.

In another embodiment, when the user is viewing the Universe View, 3D cube (Portal view), or 2D GUI, a tag cloud is displayed for the entire data set contained or, if a thread has been selected, a tag cloud is shown for that selected thread.

The tag cloud lets the user instantly see the relative importance or frequency of the words, terms, or concepts contained in without having to read the emails and attachments. This allows instant recognition of subject matter. By using the tag cloud, the user can understand some of the dominant terms, words or concepts in the cube so the user can start selecting search terms in order to further narrow down the data being displayed. This is particularly helpful when beginning a search over the entire database. In cases of a facet search that has been run on an entire database, there are additional options. One option is for the user to generate a separate tag cloud for each facet type (e.g. company, people, location, etc.). As a user adds or removes facets to the search query, the query becomes more focused and the tag clouds adjust.

Figure 9:
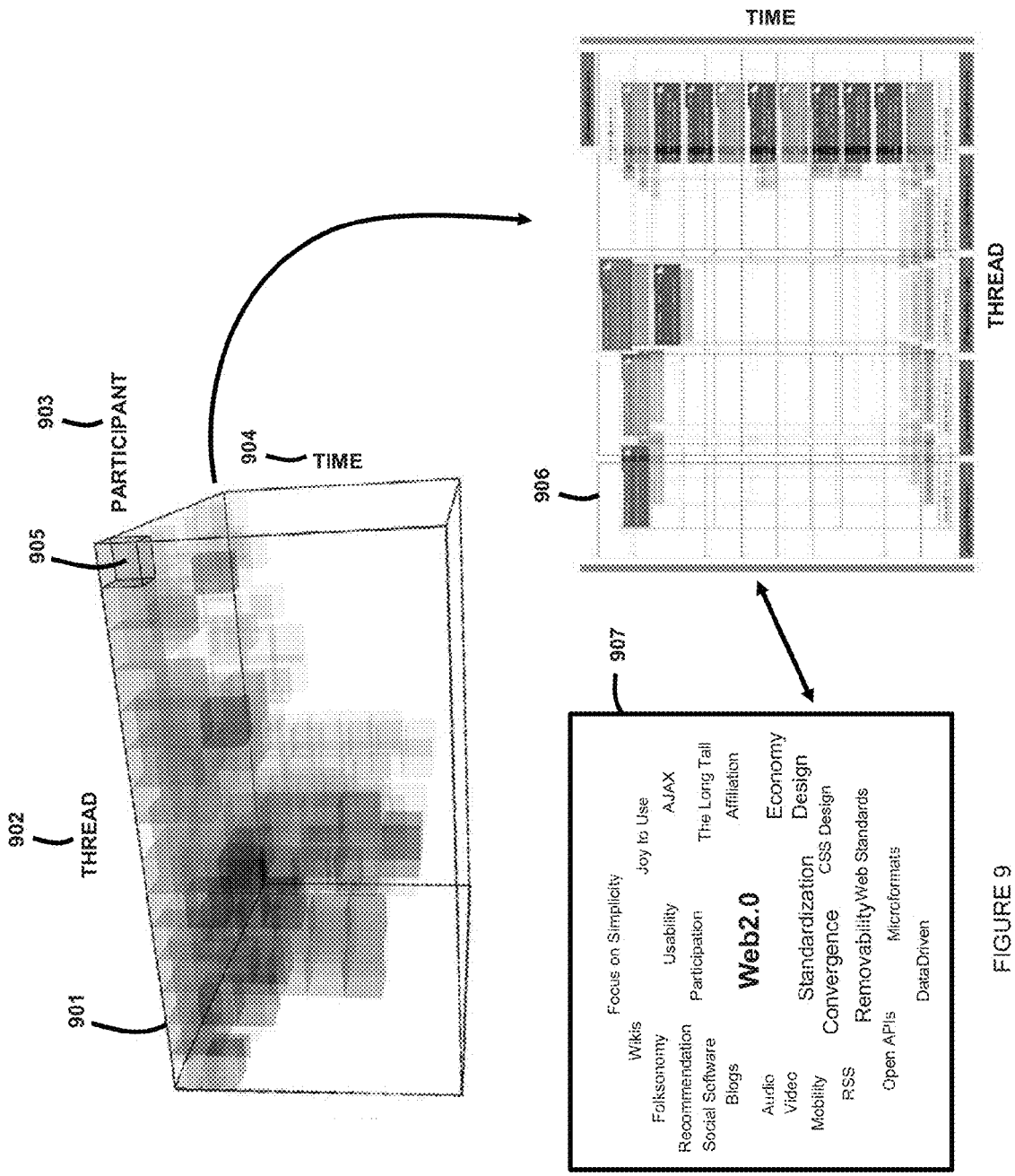
FIG. 9 is an embodiment illustrating tag clouds in the system.

FIG. 9 illustrates an embodiment of the system implementing tag clouds. The system provides a Universe View 901 with axes of Thread 902, Participant 903, and Time 904. In the example of FIG. 9, a cube 905 of data is highlighted by the user for further analysis. The system can present one or both of a two or three dimensional thread view 906 or tag cloud 907. The tag cloud is for the data set of the highlighted cube. As noted above, the tag cloud is displayed in a manner where most the common term appears in the center and is the largest in size, with other terms surrounding the common term and having sizes representing the relative frequency of occurrence of that term. In addition, the user can select certain terms to be more prominent or presented in a different color in the tag cloud as desired. As noted above, the relative location of a particular tag to a search term may impart significance as well. Such proximity can also be indicated by size, color, flashing, and the like.

Although the example of FIG. 9 is of a data cube 905, the tag cloud can also be used in connection with a selected set of participants (e.g. a plane in the Universe View at a particular location or locations on the participant axis 903), a time range (a plane on the Time axis 904) or a thread (a plane on the Thread axis 902).

Referring again to FIG. 9, the system displays a two or three dimensional thread view 906 of the data cube 905 at the same time as the tag cloud 907. Alternatively, the user may switch from thread view to tag cloud view as desired. When both tag cloud 907 and thread view 906 are visible, the user may select any subset of threads or messages in the thread view 906 and the tag cloud view will update automatically for that subset of data.

It should be noted that the tag cloud is not limited to text. The system has equal application to images that include identifying metadata. The most common image or an identified image of interest can be in the center and the next most frequent images could be in concentric orbits about that central image.

The system also presents the tag cloud with other views that do not necessarily include the Universe View. For example, in FIG. 10 we see a thread 1001 that has been generated by the user such as by a search, a drill down through the Universe View, or in some other manner. The tag cloud 1002 for that search is presented to the right of the thread on the same display or on a second display where multiple displays are available.

Figure 11:
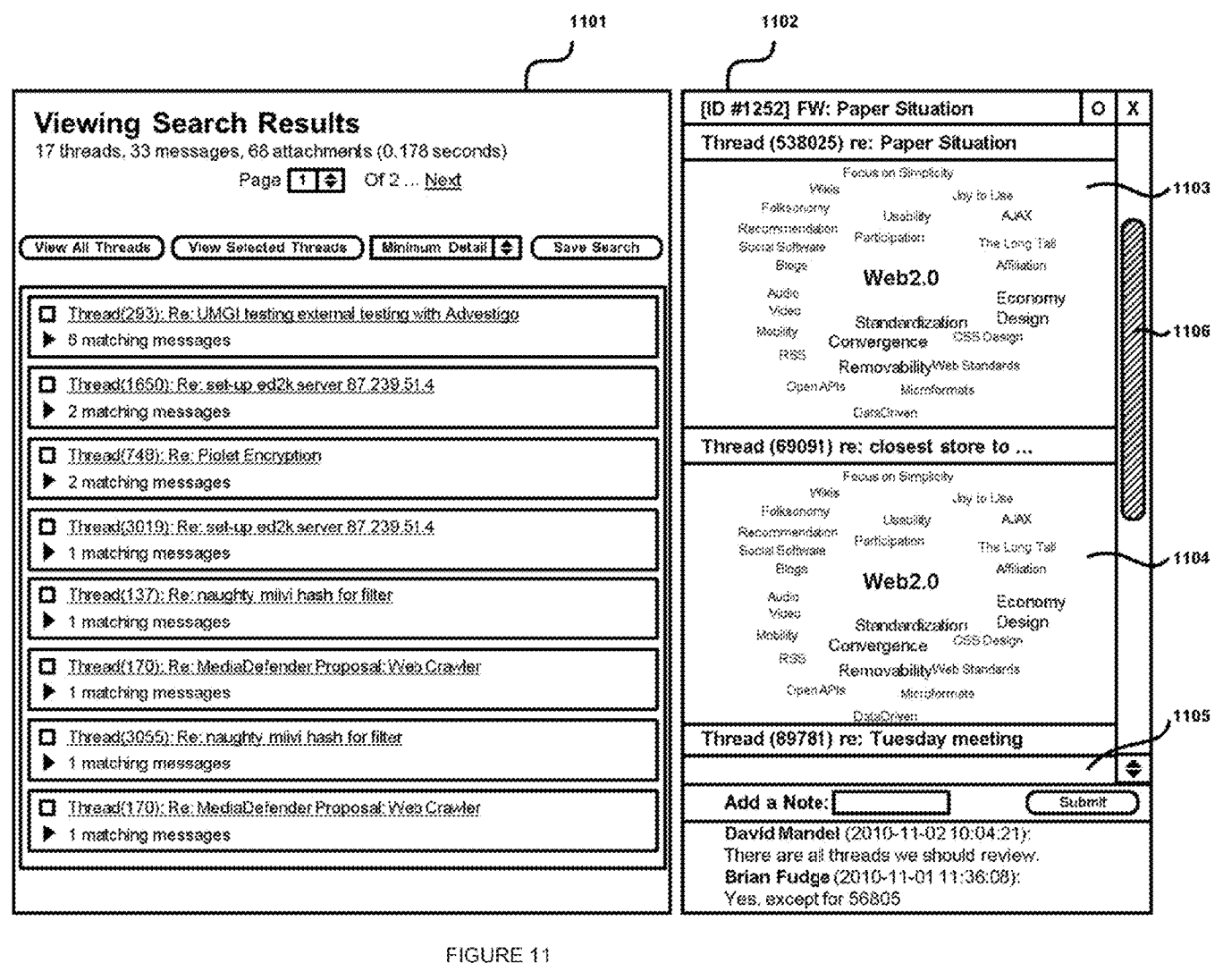

FIG. 11 illustrates another embodiment of the system where multiple threads are displayed. Region 1101 includes multiple threads where each thread is unexpanded and is represented by a single entry. For example, see Thread 293 atop the list followed by thread 1650. Region 1102, which may be on the same monitor or on a different monitor in a multiple display environment (including, but not limited to, PDAs, iPad, iPhone, Blackberry, smartphones, tablet PCs), includes a scrollable list of tag clouds where each tag cloud corresponds to one of the threads in region 1101. Each tag cloud includes a header that identifies the thread with which it is associated. See for example tag clouds 1103, 1104, and 1105 and scroll bar 1106 that is used to scroll through the various tag clouds.

In another embodiment, the tag cloud could even be presented for one or more selected emails within a thread. In another embodiment, the system computes a tag cloud on a periodic time basis. The system then subtracts out common tag cloud members from the current view as compared to prior views. The result is a differential set of terms that shows changes in presence of or strength of the tag cloud terms. This provides another visual tool (Differential Tag Cloud) to reveal trending and term presence/absence. The differential tag clouds can be played back periodicity being hours, days, weeks, months, etc. The differential tag cloud may also be mapped to a differential Universe View cube if desired.

Online Time Tracking

Figure 12:
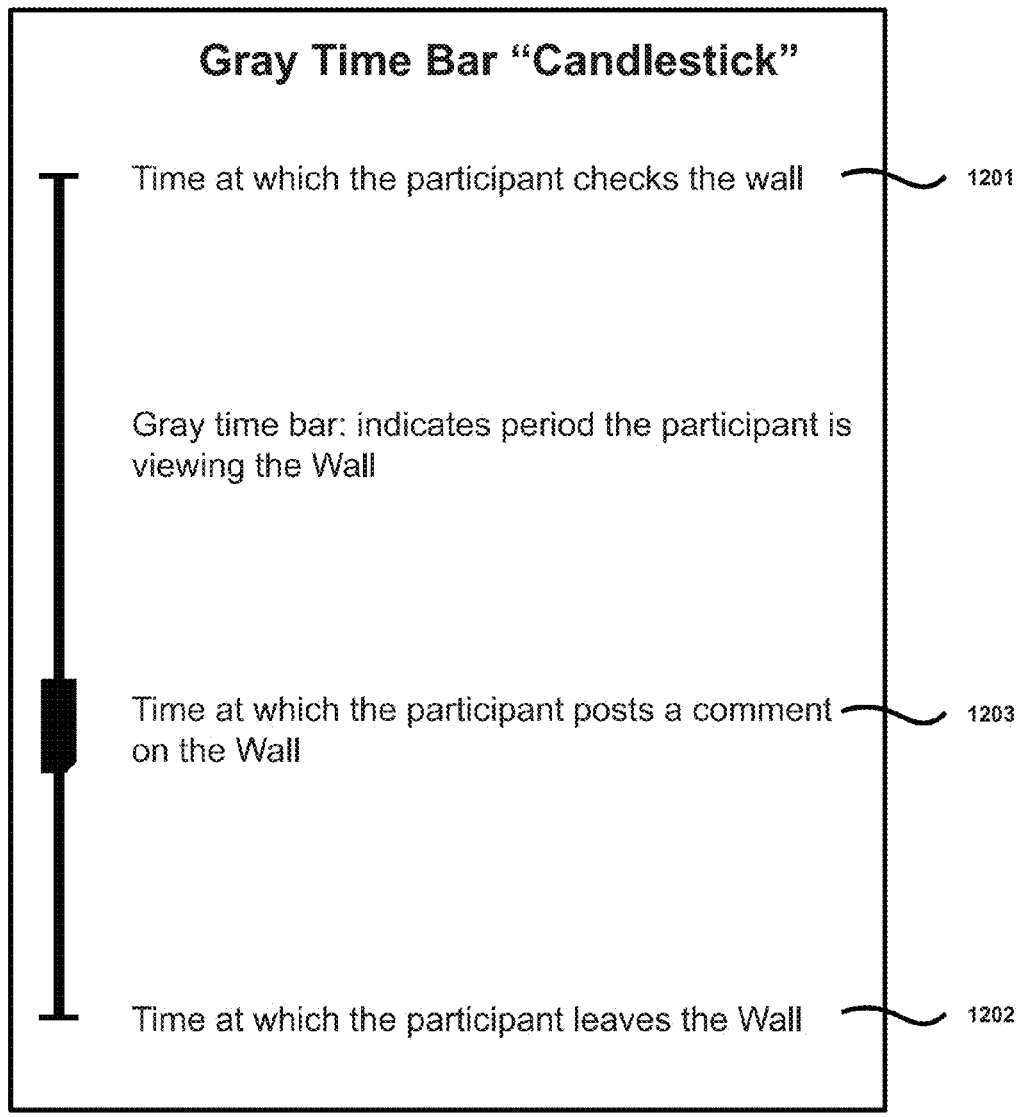
FIG. 12 illustrates a candlestick time bar.

The system also includes a number of ways to graphically indicate the sign-in to sign-out time of one or more selected users in different communication environments. FIG. 12 illustrates the iconograpy used to represent online time and message posting in a variety of communication environments. The system uses what is referred to herein as a "candlestick" to represent online time. The sign in time 1201 is represented as the top of a line (e.g. a gray line) whose length represents continuous log-in time in a communication environment. Log-out time 1202 is at the bottom of the line. A message icon 1203 represents the time at which a participant posts a comment or message. In some instances, a participant only watches or reads ("Passive Participant"), and in those circumstances the line would have no message icons. In other instances, the participant may post multiple times, with each post indicated by a message icon. The color of the message icon may be the same as in the iconography indicated above.

Figure 13:
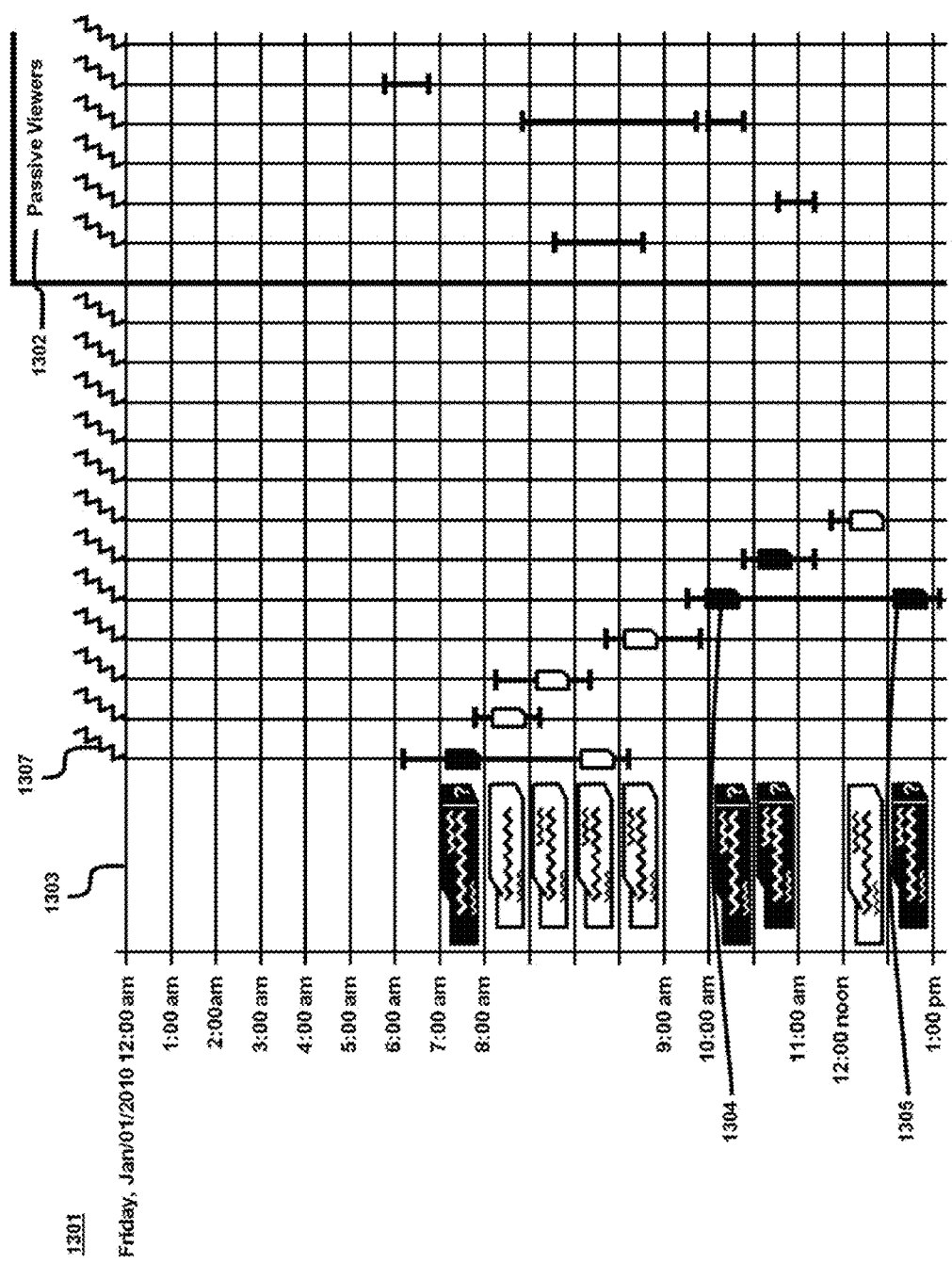
FIG. 13 illustrates online time tracking in a bulletin board environment.

FIG. 13 illustrates online time tracking in a bulletin board environment. Active participants (i.e. those that post messages) are shown in area 1301. All the participants may be shown or only those participants selected for view by an analyst. Passive viewers, those who only read and do not post during the time period of interest, are grouped in region 1302. Region 1303 uses the iconography described above to show new messages, copies, replies, and the like. Under the name of each participant in regions 1301 and 1302 a candlestick is begun at the time each participant logs in to the board. When a participant posts a message, a message icon is indicated on the candlestick such as the two postings 1304 and 1305 for participant 1307. It should be noted that during the time period of interest, a participant may log on and log off multiple times. Each log on begins a new candlestick.

Figure 14:
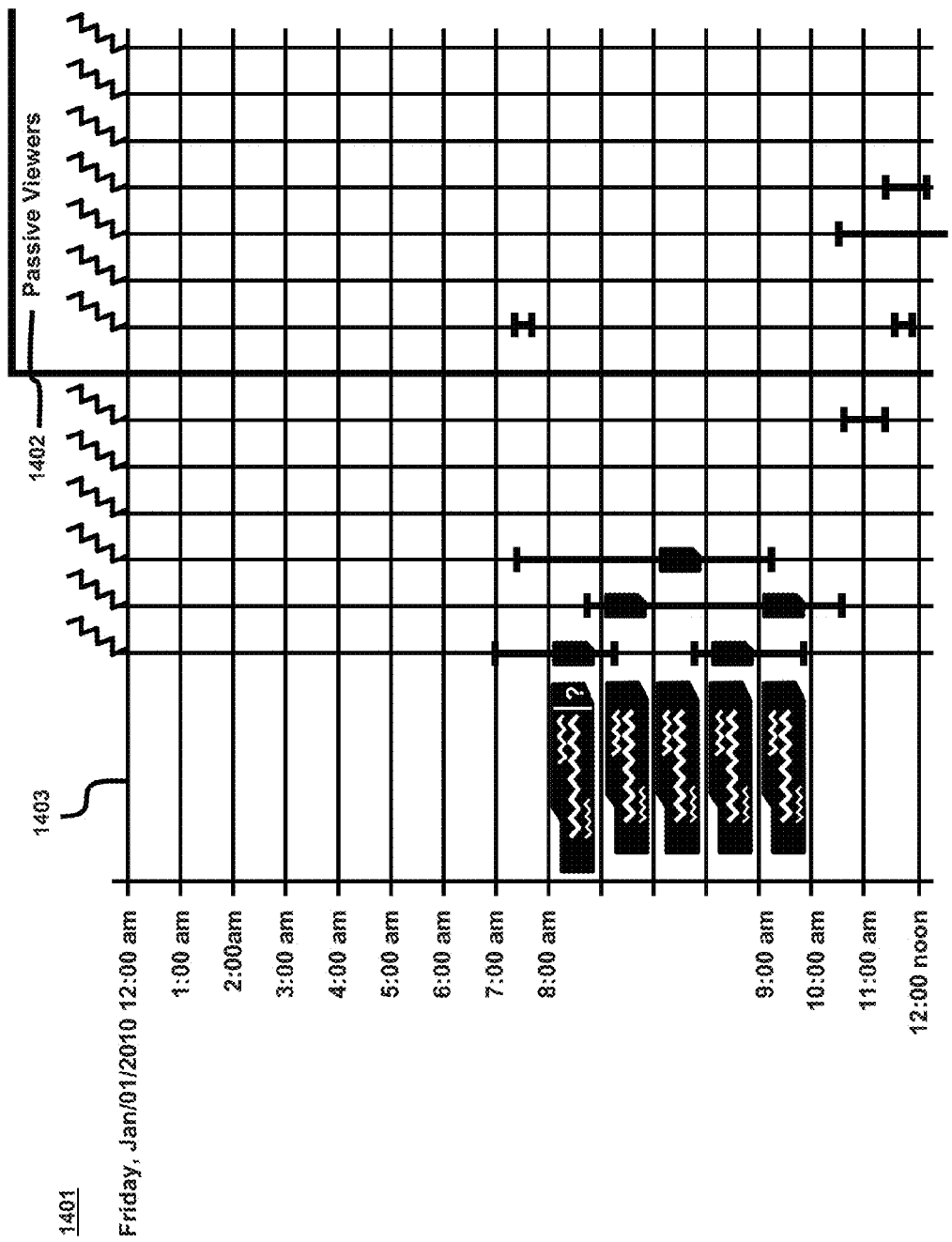
FIG. 14 illustrates online time tracking in a social media environment.

FIG. 14 illustrates a social media site using the online time tracking embodiment of the system. In the example shown, a Facebook wall is monitored over some desired time period. As before, active participants 1401 and passive viewers 1402 are grouped into respective regions. Message iconography is shown in region 1403.

Figure 15:
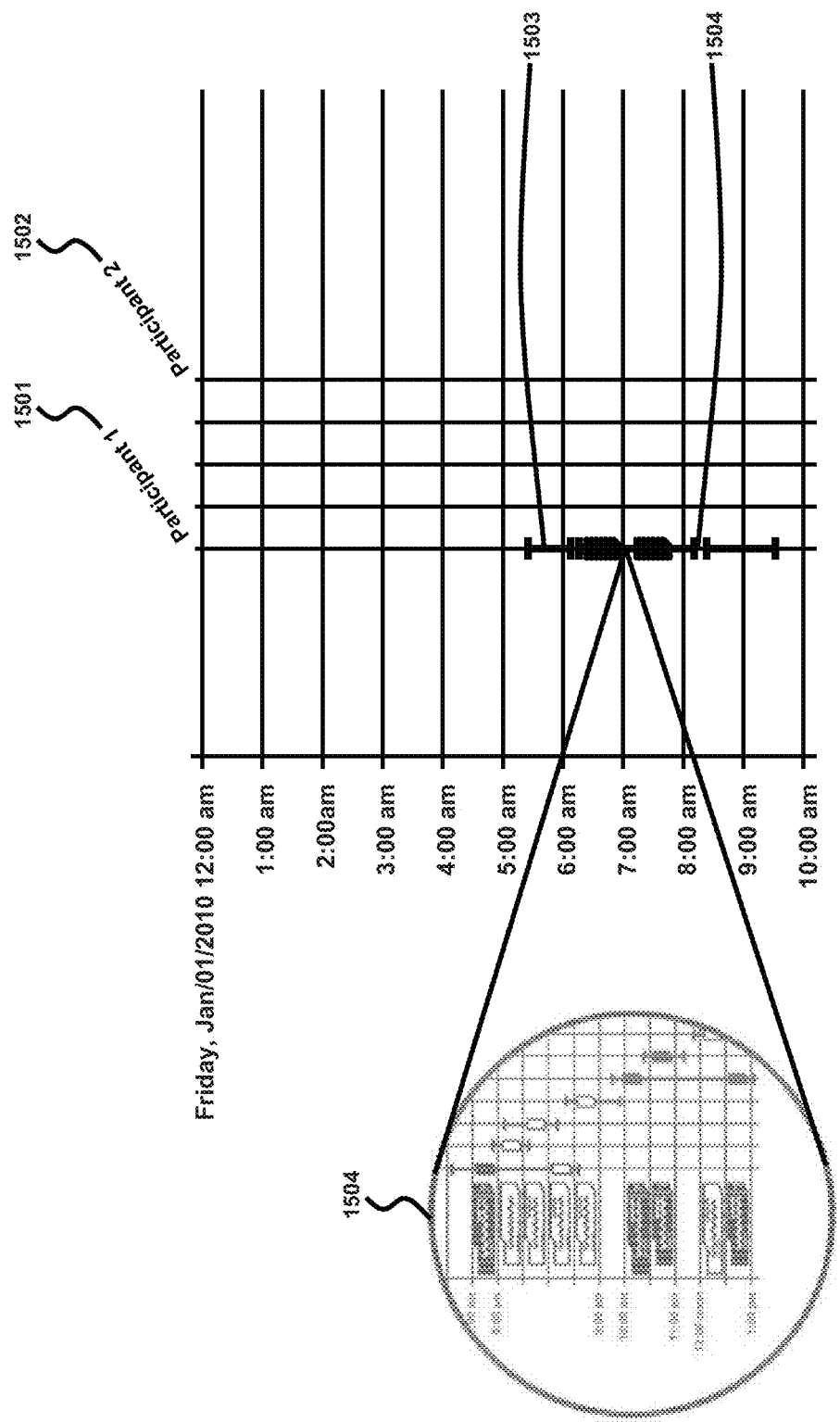
FIG. 15 illustrates online time tracking in a multi-user/multi-group environment.

Some message boards have a single login and logout time but allow the participant to open and participate in multiple message boards. One such system is Yahoo Groups. In one embodiment, the system can show activity on Yahoo Groups as a whole, such as in FIG. 15, and break out individual groups as desired by an analyst/user. Referring to FIG. 15 we see participant 1501 has logged in at approximately 5:30 a.m. as indicated by candlestick 1503. There are breaks in the candlestick, such as break 1504, to indicate the participant jumping from group to group within Yahoo Groups. By double-clicking on a participant's candlestick, an expanded image 1505 can be displayed that shows more detailed activity of that participant, in the format of FIGS. 13 and 14 or the expanded image 1504 can be displayed where it shows the state of the message board, email, thread, Facebook Wall, etc. at that time.

Database Schema

Figure 16:
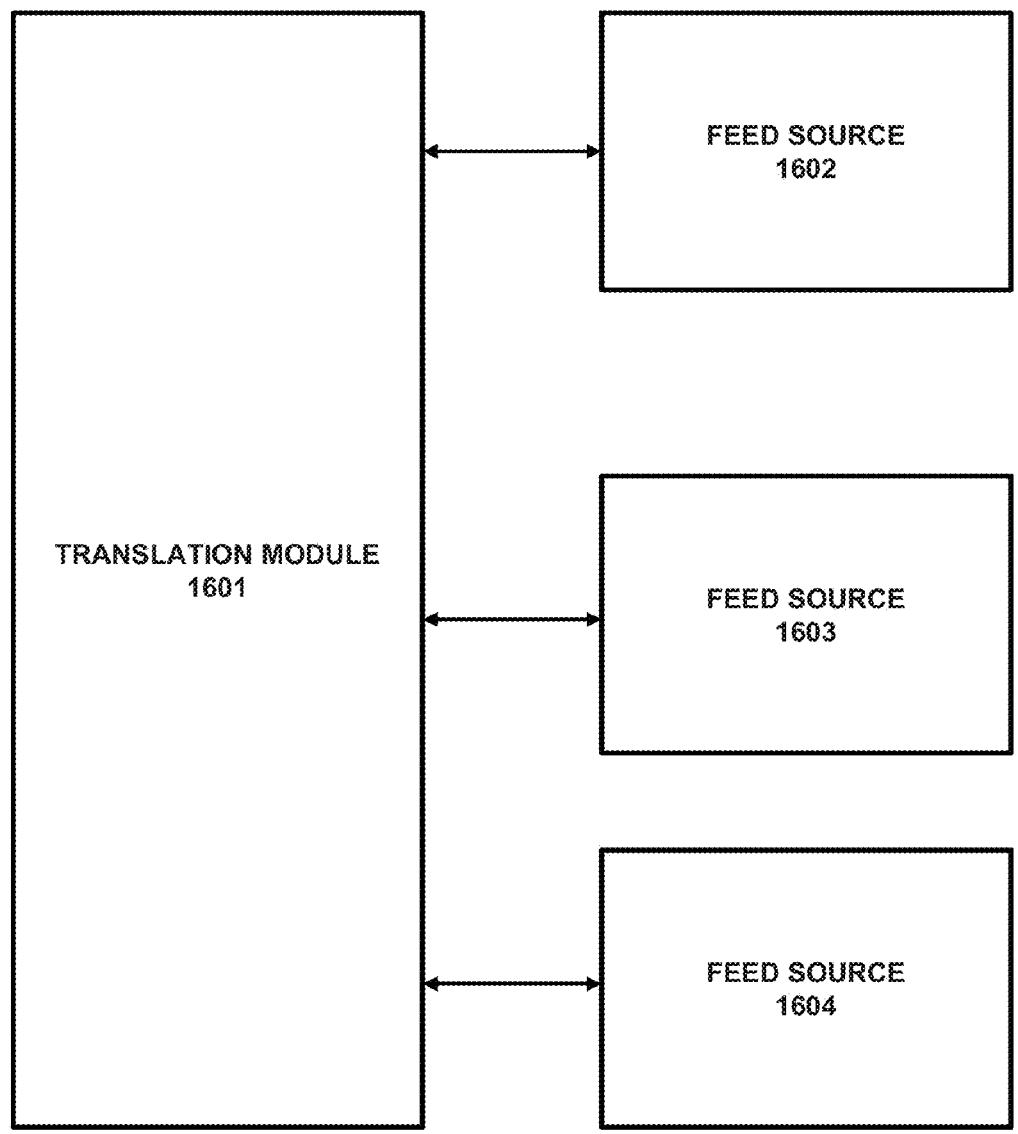
FIG. 16 illustrates a database schema of the system.

FIG. 16 is a diagram illustrating the database schema and operation of an embodiment of the system. There are a plurality of feed sources 1602, 1603, and 1604 that can be coupled to a translation model of the system. Although 3 feed sources are shown in FIG. 16, this is by way of example only, and the present system has equal applicability to any number of feed sources without departing from the scope and spirit of the system. A feed source is any source of data that may be of interest to a user or analyst. This may include communication data as described previously, including email, twitter, social media, and the like, medical data, travel data, or any type of data source. The system provides a translation module 1601 in communication with the feed sources to normalize the data into a format that is usable by the system for sorting, searching, displaying, and relating to other data.

Figure 17:
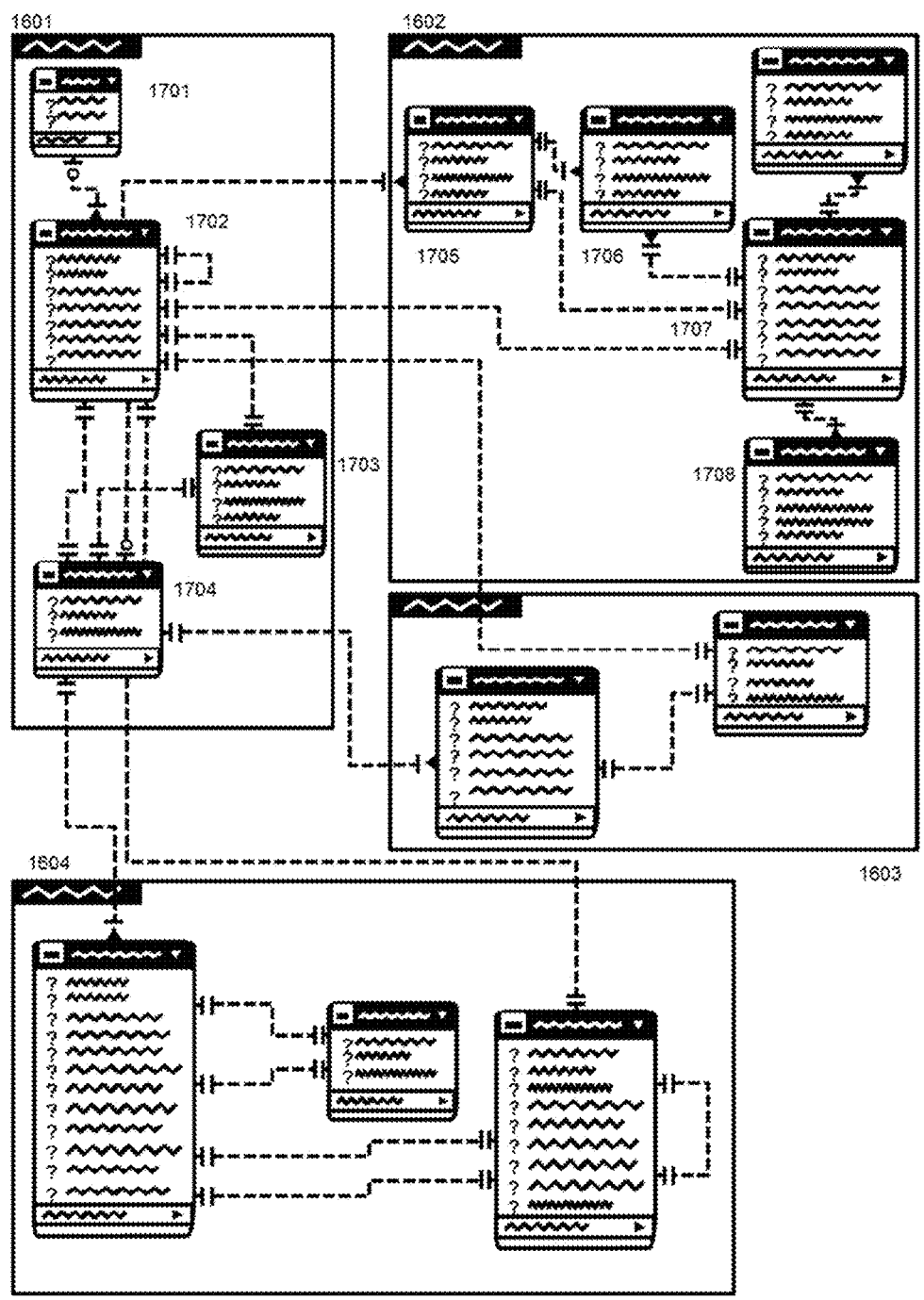
FIG. 17 is an example of a database schema of FIG. 16.

FIG. 17 is an expanded view of the system of FIG. 16 with the examples of certain feed sources email 1602, Facebook 1603, and Twitter 1604. The translation module 1601 includes a plurality of databases for storing converted data including thread database 1701. The thread database stores messages, whatever their provenance and feed source, that are considered to be part of a thread. The thread can be defined automatically by the system by taking advantage of threading information from the feed sources (i.e. emails, replies, forwards, cc's, etc.) and/or via manual definitions provided by an analyst or user.

Message database 1702 in module 1601 is a normalized message that has certain fields defined by the system so that all messages may be sorted and manipulated in a consistent manner, regardless of their source. The message database 1702 may or may not include all of the original fields, data, metadata, and information of a source message. Regardless, the original message and all its related data and information is maintained in the feed source database such as message database 1707 in feed source database 1602. Message database 1707 may have an associated attachment database 1708 for storing message attachments. Profile database 1705 and destination database 1706 may also be associated with message database 1707.

Desination database 1703 stores the information related to the recipient(s) of the message. Profile database 1704 is used to define a sender profile that can identify a single participant who may have different user profiles on each feed source. The system can automatically identify a participant profile by relying on data associated with a profile of a participant and to merge related profiles into a single participant profile as warranted. In other embodiments, this automatic configuration is supplemented by manual linking provided by analysts or users. The profile database 1703 (described below) is a powerful tool that allows a single participant to be tracked over a wide variety of feed sources.

Profile Builder/Editor

The system includes profile technology that allows the system to associate multiple communication identifiers with the same entity, track that entity over time, and give an analyst the ability to monitor and influence those changes.

Consider, for example, an entity, "John Smith", that may be associated with a variety of communication identifiers: e-mail addresses, phone numbers, physical street addresses, Twitter handles, Facebook profiles, instant messenger handles, etc. Entities may have the same name but still correspond to two different people, for example "John Smith" of Omaha, Nebr. and "John Smith" of Los Angeles, Calif. The communication identifiers of entities may even change over time as addresses are abandoned and reused. Consider the case of "John Smith" of Omaha, Nebr. and "John Smith" of Los Angeles, Calif. trading houses. How can these entities be differentiated? The answer lies in obtaining enough communication identifiers and tracking those over time. The system can identify the two people named "John Smith"'s as different because it can be seen that while their physical addresses swap they might retain the same cell phone numbers over the same period of time.

Other types of entity changes can be tracked as well. If "John Smith" of Los Angeles, Calif. with phone number 323-555-1002 cancels his cell phone and "Joe Smith" of Los Angeles, Calif. obtains a cell phone with the number 323-555-1002 our profile tracker must distinguish between a name change of the person and a cell phone number reassignment.

The profile technology incorporates algorithms that automatically extract name, time, and communication identifier from fragments of conversations. For example, the e-mail profile builder may process millions of e-mails from a company spanning 3 years of time. It extracts information from e-mail headers and footers. During this time, two people named "John Smith" may have worked for the company. The first "John Smith" worked in year 1; the second in year 3. The profile builder would extract that the address "jsmith@company.com" pointed to "John Smith" in year 1 and 3. The profile builder would also extract that no "jsmith@company.com" references were found in year 2. It might also determine from vCard or e-mail signatures that "John Smith" #1 had cell phone 858-555-1003 and "John Smith" #2 had cell phone 858-555-1004. From this information, two profiles of "John Smith" would be built, with highly accurate start and stop dates for each of the components of his profile.

The technology allows for analyst input, feedback, and continuous improvement. Analyst input includes: organization charts, personnel records, phone directories, or public records databases. Analyst feedback includes initial review of the automatically identified profiles. An analyst might split a profile or join unidentified e-mail addresses into a profile. Analyst continuous improvement involves flagging troublesome profiles while reviewing data and making modifications to suspect profiles. The system can also enhance profiles as new data is loaded.

Thread Ranking

The system can also employ a thread ranking process that applies metrics to a thread, sub-thread, or posting/comment(s) group for ranking purposes. In one embodiment, the ranking may be based on multiple metrics including, but not limited to, number of pointers to a thread, forwarding frequency of a message, and other popularity-based metrics.

Search engines have links as a method of ranking search terms, web pages, and the like. In the present system, such links may not be available.

The system instead applies other metrics to provide a way to rank a thread, sub-thread(s) or posting/comment(s) group. In one embodiment, the system uses such metrics as time, keyword, facet, and e-mail/other address, and uses Profile Builder (described above) and Conversation Builder. The Thread Rank could also help to pull conversation bits together that weren't otherwise connectable. Another embodiment could leverage the facets extracted from messages combined with the participants in those messages. Messages and threads would score higher in search results when they contain influential people or popular facets or any number of other combinations of things indexed by the system. In one embodiment, if the term entered in a search query appears in the originating message/posting in a thread, that thread can be ranked higher in the search results than a thread which contains the search term in a later posting, since the thread is starting from the point of interest.

Some of the parameters used in one embodiment of the system for thread ranking include number of participants involved in a communication, the number of times one or more keywords are mentioned, the strength of sentiment of the communications, and the like. The number of interactions involved in the thread or sub-thread(s), along with the quality of the correspondence or matching to the keywords may also be a factor. That is, spam or junk mail communications will be of lower quality than high level or personal correspondence. Similarly, the quality of the participants will affect thread ranking. The frequency of communications between participants is evidence of a high quality relationship. A shortened time period of intense discussion or use of keywords is also weighted more heavily than more periodic discussion.

The system contemplates using thread ranking in a social media search engine. Uses of the search engine include, but are not limited to, a standalone website focused on social media searches, an application that other social media or online community websites integrate for searching their bulletin boards or forums, an application that companies or service providers integrate into websites for searching help forums, internal blogs or online communities on corporate websites, an application that would be downloaded to a PDA/smartphone/iPad for searching personal or enterprise data, and integrating the search engine with other applications. The system has the capability of not only visualizing and comparing social media conversations across communication domains (i.e. compare conversations occurring in email vs IMs vs social networks), but also has the ability to compute the relevance of any social network thread (or posting/comments group) in comparison to the others threads (or posting/comments groups) identified and ingested. This is accomplished using the thread ranking described above. With appropriate search parameters, the thread ranking returns relevant threads from multiple platforms and communication sites.

In one embodiment, the system includes metadata about threading information that is provided upon ingestion of the communication information. The source application can stamp or tag or provide metadata about threads that are formed using the particular source application. The present system takes advantage of this data to avoid the need to create or recreate a thread when it has already been defined by the source application.

In one embodiment, each metric is normalized to a range between 0 and 1 inclusive. This allows the metrics to be combined with the user-selected weightings to generate a single composite score on the fly, which is then used to rank the threads. Each normalized metric can be thought of as placing the thread in a percentile category for its given dimension. Visualizations can show average values for the metrics, or statistical distributions of the metrics. Sentiment can be analyzed and displayed on a paragraph-by-paragraph or word-by-word basis (doesn't have to be analyzed and displayed for the entire thread).

Examples of metrics for each thread or messages contained in a thread:

Thread length (tm_thread_length_ratio)—Length of all messages in thread, not including attachments.

Number of messages (tm_num_messages_ratio)—Number of messages in each thread.

Number of users (tm_num_profiles ratio)—The number of users participating in each thread.

Average message length (tm_avg_message_length_ratio)—The average message length for each thread, not including attachments.

Entropy score (tm_entropy)—The combined entropy score of all messages in thread. This is a measure of how complex or unique the contents of the thread are.

Average spam score (tm_spam_ratio)—This is the average SpamAssassin spam score for each message in the thread.

Fog readability score (tm_read_og_ratio)—A readability score that indicates the approximate grade level of the text.

Flesch-Kincaid readability score (tm_read kincaid_ratio)—A readability score indicating the number of years of education needed for comprehension. Used to limit complexity of legal and military documents.

Number of unique concepts (tm_num_concepts_ratio)—The number of unique concepts in a thread as determined by the search engine. Includes concepts in both messages and attachments.

Average sentiment score (tm_sentiment score_ratio)—Average sentiment score of messages and attachments normalized across all the messages in the thread as calculated by the search engine.

Concept density (tm_concept_density_ratio)—total number of unique concepts in all messages in the thread, divided by the length of each message, calculated for all the messages in the thread.

Average new concepts (tm_avg_new_concept_ratio)—The average number of new concepts introduced per message (plus attachments) in each thread.

Average concept change (tm_avg_concept_change_ratio)—The average number of concepts introduced or removed per message (plus attachments) in each thread.

Universal Communications Manager

The system may also be used by a person to data-mine and analyze their own communications across multiple communications platforms. The user would give permissions to the system to use the person's own communications channels (e.g. email, texts, Twitter, Facebook, cell phone, and the like) as feed sources. Public or other feed sources that are available may also be used by the system. The system could then be used to automatically generate contact lists that are more useful and robust than current contact lists. For example, the system could include the date and type of initial interaction with a contact and cross index it with a personal calendar so that the context of the initial contact is known. For example, if a user's first communication with a contact was via an email and the user's calendar application shows that the user was attending a conference, there may be a high likelihood that the contact was made as a result of the conference.

The system can work in the opposite direction as well. The user could query the system to find all contacts made while attending some event or in a certain time period or all communications related to a particular subject. The system can collect all related threads or posting/comment(s) groups and use the thread ranking system to provide useful and usable results to the user. The profile builder described above can then be used to define contacts.

The system can also be enabled to search for context in communications with people in the contact list. For example, if a birthday is mentioned in the communication, the system can fill in the birthday field for that contact, and generate reminders in the future as part of its operation. It may be that some other party has indicated the birthday status, but the system makes the connection anyway and benefits the user with information about the user's contacts. The system can thus build more complete profiles automatically.

Targeted Marketing

Because the system can find related threads and build profiles of participants, it is useful for building lists of participants for targeted marketing. If a known group of participants having desired characteristics is available, an assumption may be made, in some cases, that the communicants of these participants may share similar interests. Thread ranking may also be useful. Communicants who have a high interaction ranking with the desired group are even more likely to share common interests. A higher response to targeted advertising and marketing may be expected.

Another use of the system in targeted marketing involves selection of ads to push on social media websites, blogs, or forums. The system utilizes the threading ranking engine and facet extraction and tag cloud information, and applies these things to the context of ad targeting on social media or online community websites, blogs, or forums. The output of the system would include a rank ordered list of keywords, concepts, or other extracted facets that would characterize that particular social media user or group of users best over a set of conversations with the users that they are most actively interfacing with. These terms, concepts or other facets are requested at the time of ad insertion to drive the best ad to be served. Thread rank is used to more accurately weight the terms, concepts and facet results from the facet extraction and tag cloud algorithms, which are in turn correlated to the kind of ads to be targeted. For example, if the term "hot dog" appears once in three different threads or posting/comments groupings that have a high thread rank, and the term "doughnut" appears one to three times in ten different threads with very weak thread rankings, the system would push ads related to the term "hot dog", because that term is occurring in much more important conversations.

The system may also be applied to a video game or computer game. The play could involve, in one embodiment, navigating through a system of objects represented by the Universe View (i.e. system of planets, system of rooms in a building, system of objects, or some other source database that is the source for randomly generated objects in space) that you try to find things in or navigate around using the navigation cube while the Portal View is simultaneously updated.

Circle/Volume Presentation

Figure 21A:
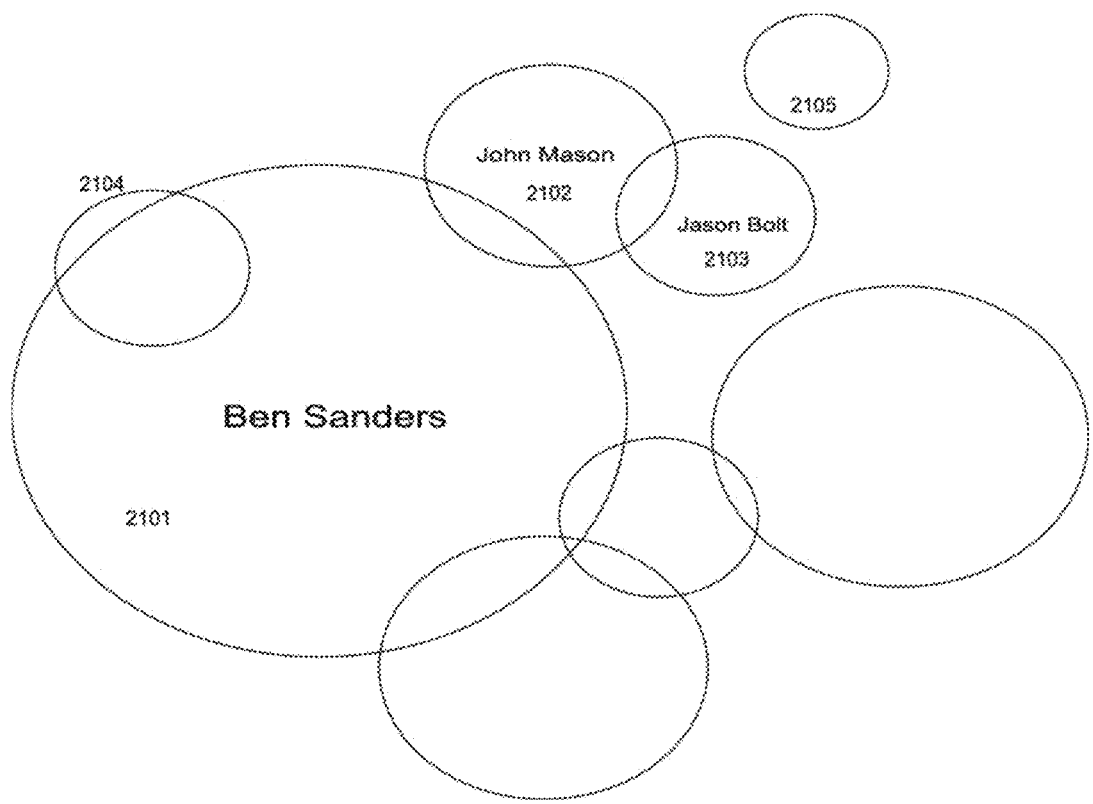
FIG. 21A is an example of a circle/volume display in an embodiment of the system.

In some instances, it may be useful to indicate visually the relative amounts of communication by certain selected participants. An embodiment of the system that presents this information graphically in the form of circles is illustrated in FIG. 21A. In FIG. 21A, each circle represents one participant. For example, see circle 2101 representing a participant Ben Sanders, circle 2102 representing participant John Mason and circle 2103 representing participant Jason Bolt. Other circles in FIG. 21A represent other participants. In one embodiment, when the user mouses over a circle, the name of the participant represented by the circle will be displayed. In other embodiments, the names of the participants are displayed in the circles even when the mouse is not over the circle.

In the embodiment shown in FIG. 21A, the size of the circle represents the amount of communications by that participant. The sizes of the circles are relative, so that a circle that is twice the size of another means that the participant has sent twice as many communications as the other participant. The overlap of one circle with another indicates direct communications between the two participants. The more overlap, the higher the percentage of communications are directly between the participants. For example, circle 2104 is nearly fully within circle 2101, meaning that nearly all of the communications of the participant represented by circle 2104 were with the participant of circle 2101. Participant 2105 has no overlap with any of the circles in FIG. 21A, meaning that there was no direct communication between that participant and any of the others.

The circles can represent a communication volume over a particular time period, related to certain keywords or subjects, or any combination of search or data criteria as desired by the user.

Figure 21B:
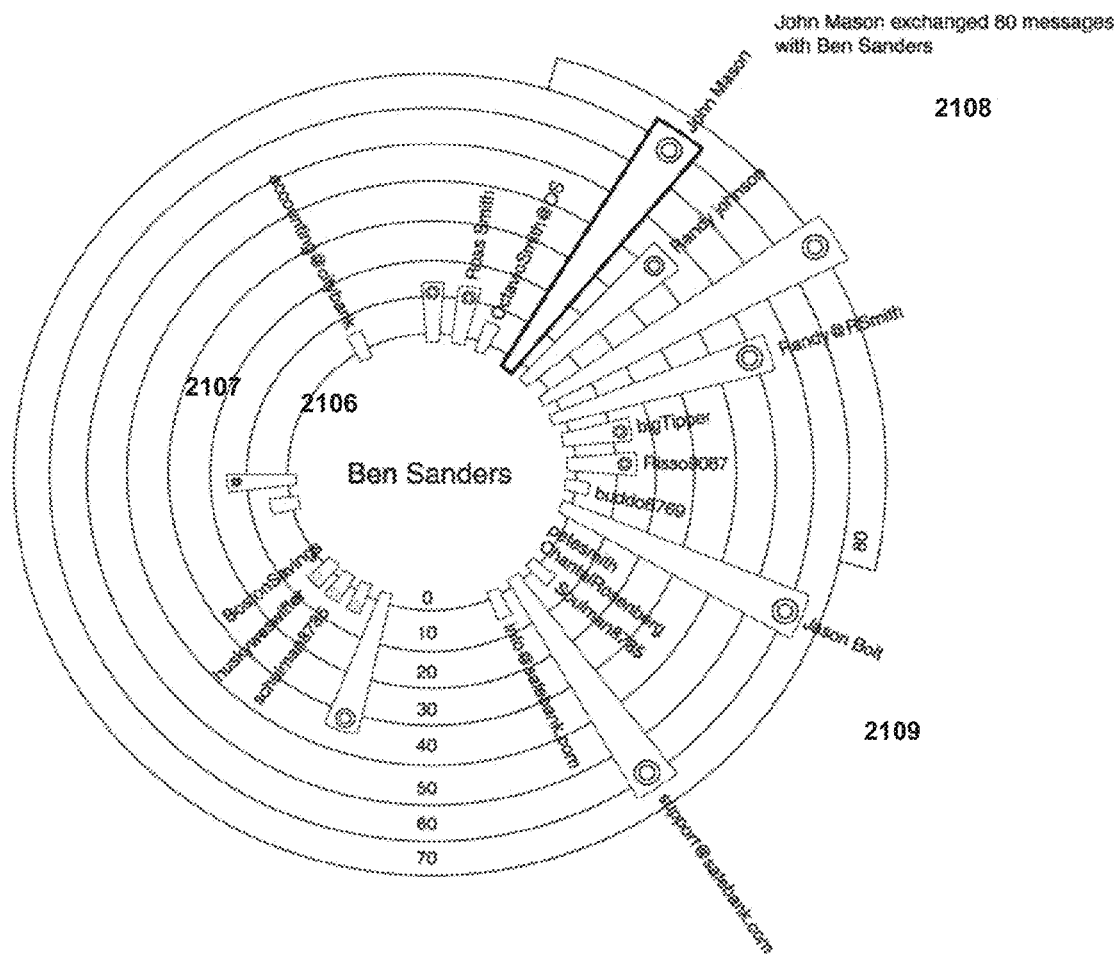
FIG. 21B is an expanded view of circle 2101 of FIG. 21A.

Clicking on an individual circle brings up a detailed view of that participant such as is shown in FIG. 21B. In the example shown, the image represents communications exchanged by participant Ben Sanders and Jason Bolt over a one month period, with each concentric circle (e.g. 2106, 2107) representing 10 messages. (It will be understood that the scale of the rings can be changed as desired). Each communicant with the participant is represented as a pie slice or "carrot" such as carrots 2108 (John Mason), 2109 (Jason Bolt), and the like. By clicking on one of the carrots, the user may view a new display that includes the original participant plus the selected participant.

Figure 22:
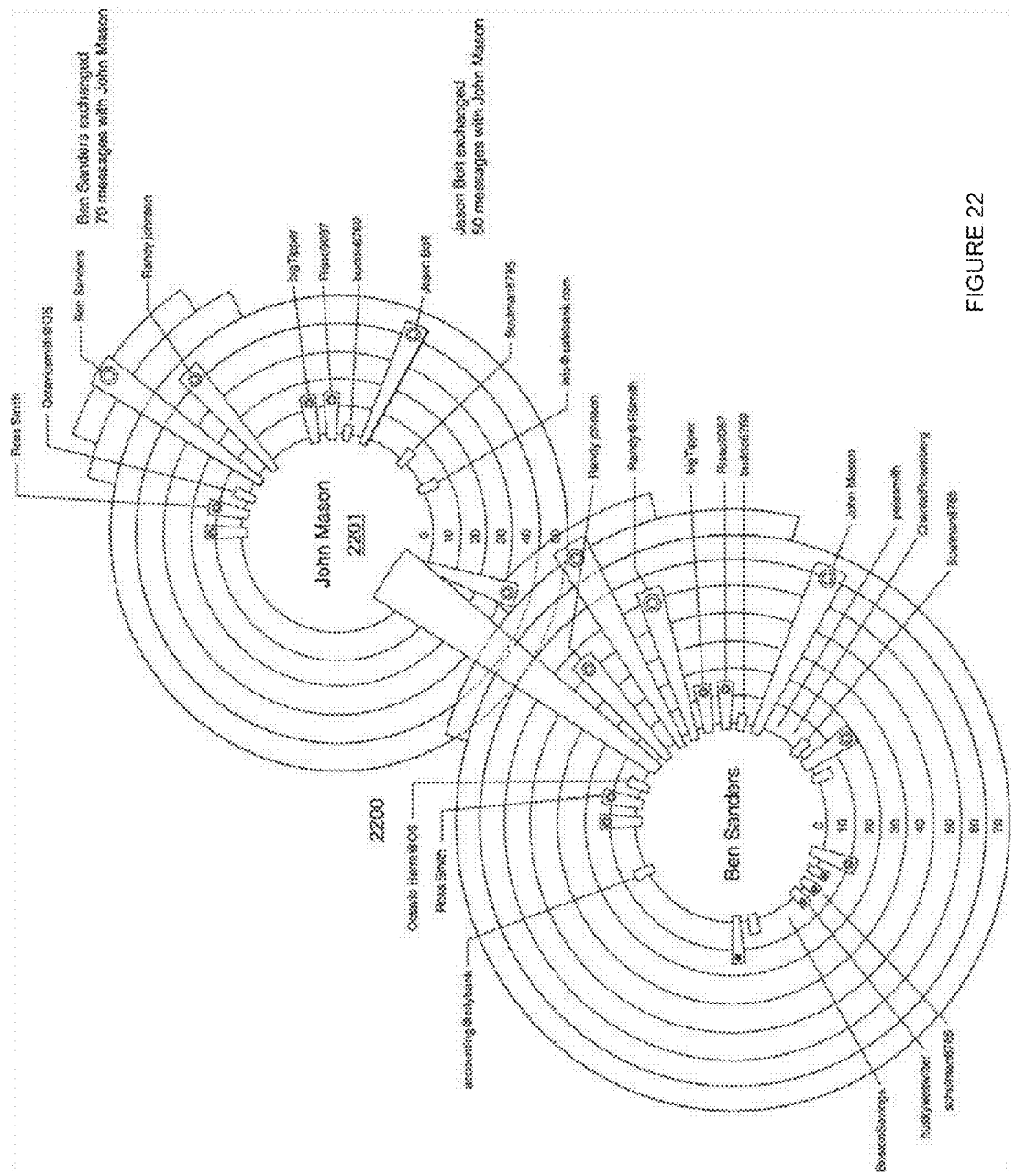
FIG. 22 is an expanded view of FIG. 21B.

Such a view is illustrated in FIG. 22, showing the selection of participant John Mason. A circle 2201 for John Mason is extended of the carrot 2108. Similarly to FIG. 21, the circle 2201 represents one month of messages for John Mason. The circle 2201 has its own carrots representing communications with other participants. As is shown in FIG. 21A, there is an overlap region 2202 between the circles that represents the direct communication between the participants.

Although not shown, the user can cascade a number of circles from the original participant circle, or from each circle that appears by clicking on a carrot of a circle. This creates a new circle that will show its own carrots of communications. If desired, the user can highlight a carrot and elect "list view" of the messages represented by the carrot. In this instance, the messages will be presented in a list view as described with respect to other views herein or as desired by the user.

As with other presentation views herein, the user can filter the view via a number of metrics, including number of messages, date range, keywords, participants, and the like.

Figure 35:
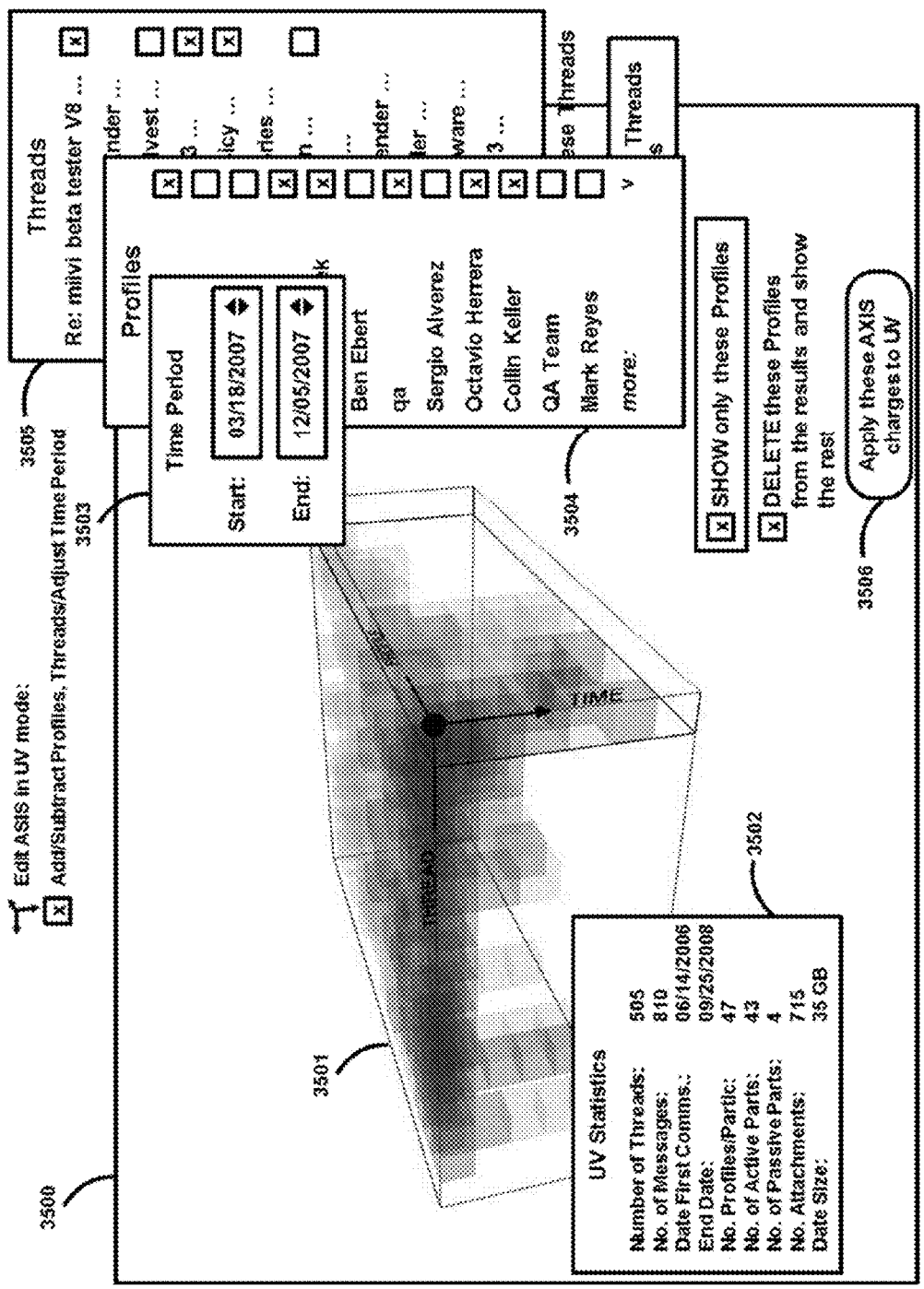
FIG. 35 illustrates a filtering technique with the Universe View.

In one embodiment presented in FIG. 35, the user is able to filter the Universe View without leaving the view. The Universe View 3500 includes a statistical summary 3502 of metrics being displayed. The user can pull up filtering menus 3503, 3504, and 3505 that are automatically populated by relevant time periods, profiles, threads, and the like, based on data available in the Universe View. The user can then select check boxes to further filter the view. Region 3506 allows the user to include or exclude checked items as desired, allowing an easy toggling between views and simplifying filtering.

Slab View

Figure 23:
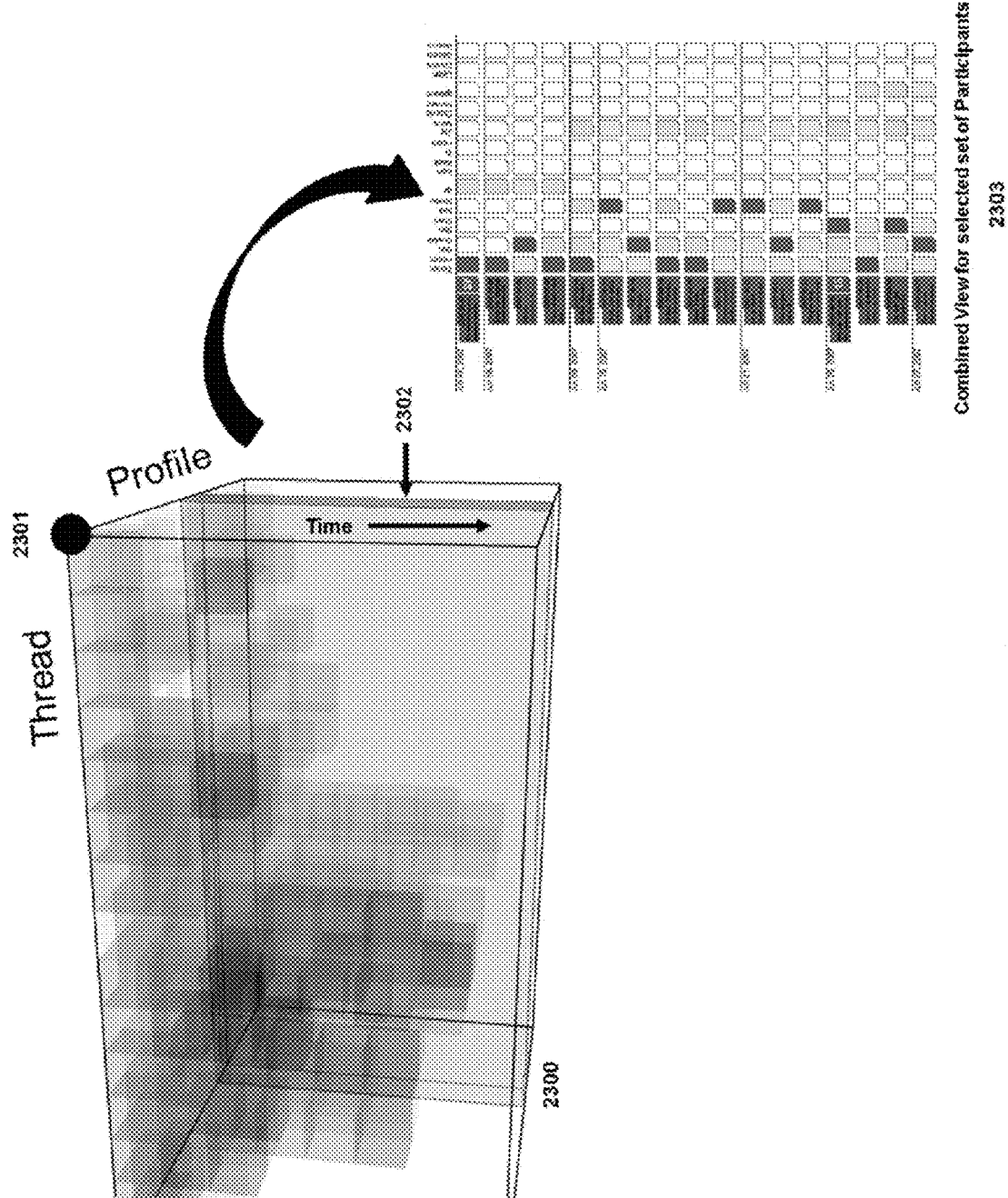
FIG. 23 is a view of an embodiment of the system using a slab tool.

The system provides a selection tool for navigating through the Universe View (i.e. the Universe View of FIG. 1). FIG. 23 illustrates the selection tool in one embodiment of the system that shows a combined view. The Universe View 2300 includes axes of thread, profile, and time, with an origin at the black ball 2301 in the upper front right corner of the universe cube 2300. A slab/selection tool 2302 can be used to move in a plane through the universe cube. In the example shown, the slab 2302 is parallel to the face of the cube 2300 and moves back and forth along the profile axis (participant axis) of the cube 2300. As the slab 2302 is moved, the corresponding Combined View 2303 is shown on the other half of the display, displaying the threads for the selected Participants. The Combined View 2303 is updated continuously as a user moves the slab/selection tool 2302 around.

Figure 24:
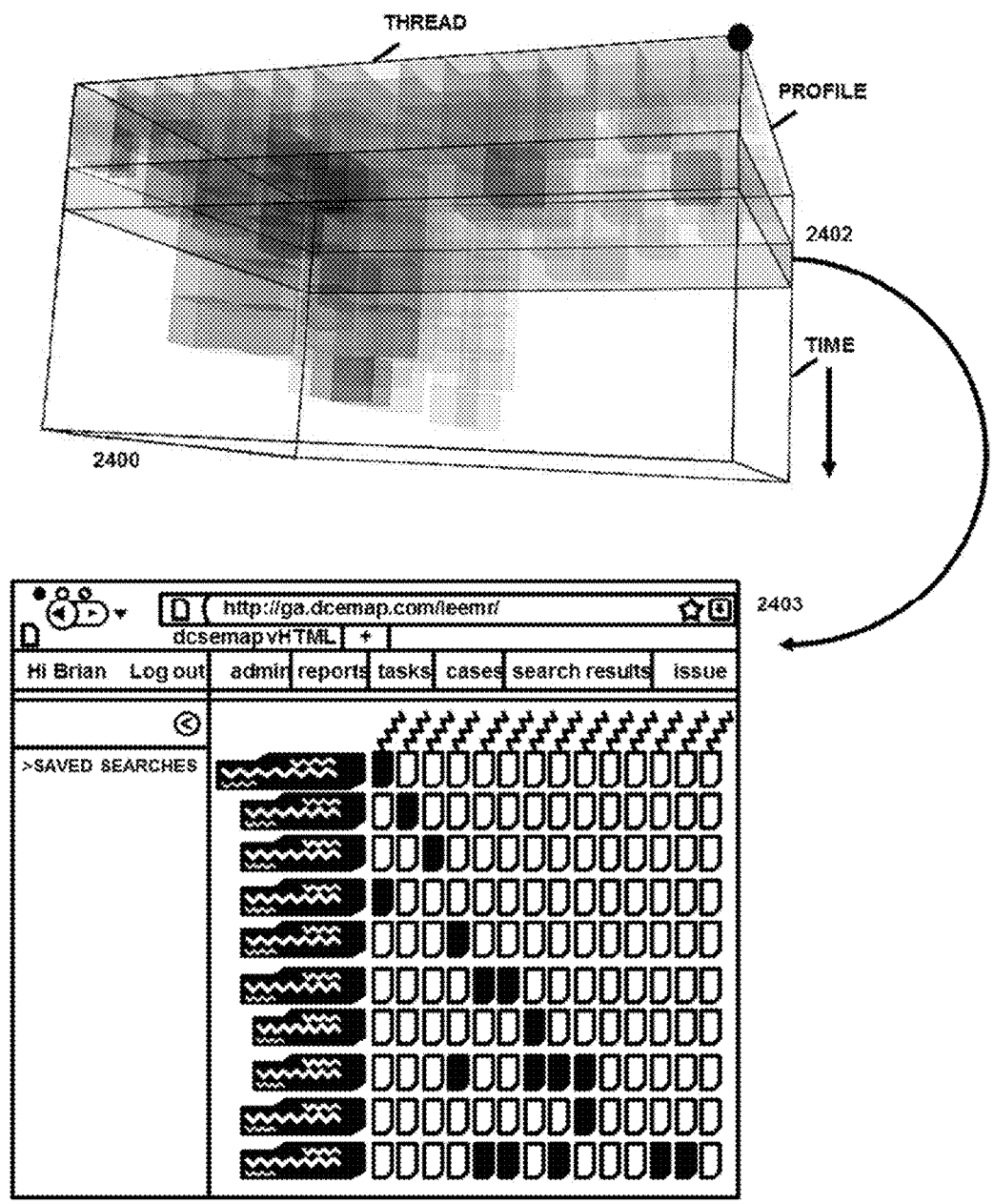
FIG. 24 is another view of the slab tool embodiment.

The slab/selection tool can have any orientation with respect to the cube as desired. Referring now to FIG. 24, the Universe View 2400 is shown with slab/selection tool 2402 oriented as a plane perpendicular to the time axis. As the user moves the slab 2402 up and down the time axis, the display shows the relevant threads (i.e. those intersected by the slab) for the associated period of time. The threads can use the color coding as described above or any other appropriate scheme as desired.

The view presented to the user can be a combined view or a tag cloud as desired and as described above, or any desired view that embodies the message and thread data selected by the slab. In one embodiment, the system can display both a tag cloud and a combined view at the same time. The views are updated automatically as the slab moves along its axis of orientation. This tool allows the easy conversion of a 3D view to an adjacent 2D view (tag cloud or combined view). In one embodiment, the axes can be relative or absolute. By default, the system displays the messages using compressed time where the time axis is compressed, such that any time gaps (periods of time where no messages occur) are eliminated. Alternatively, the system can be set so that actual date and time is maintained such that the time axis is uncompressed, and each message and thread is displayed on the Time axis with their respective correct date and time. In another embodiment which can be done with either compressed or uncompressed time, the threads can all be positioned along the top of the cube using relative time, such that the starting point of all the threads are placed at Time=0 on the Time axis. Alternatively, the threads can all be positioned using absolute time, such that the starting point of each thread is the actual date and time on the Time axis when that thread started.

Figure 25:
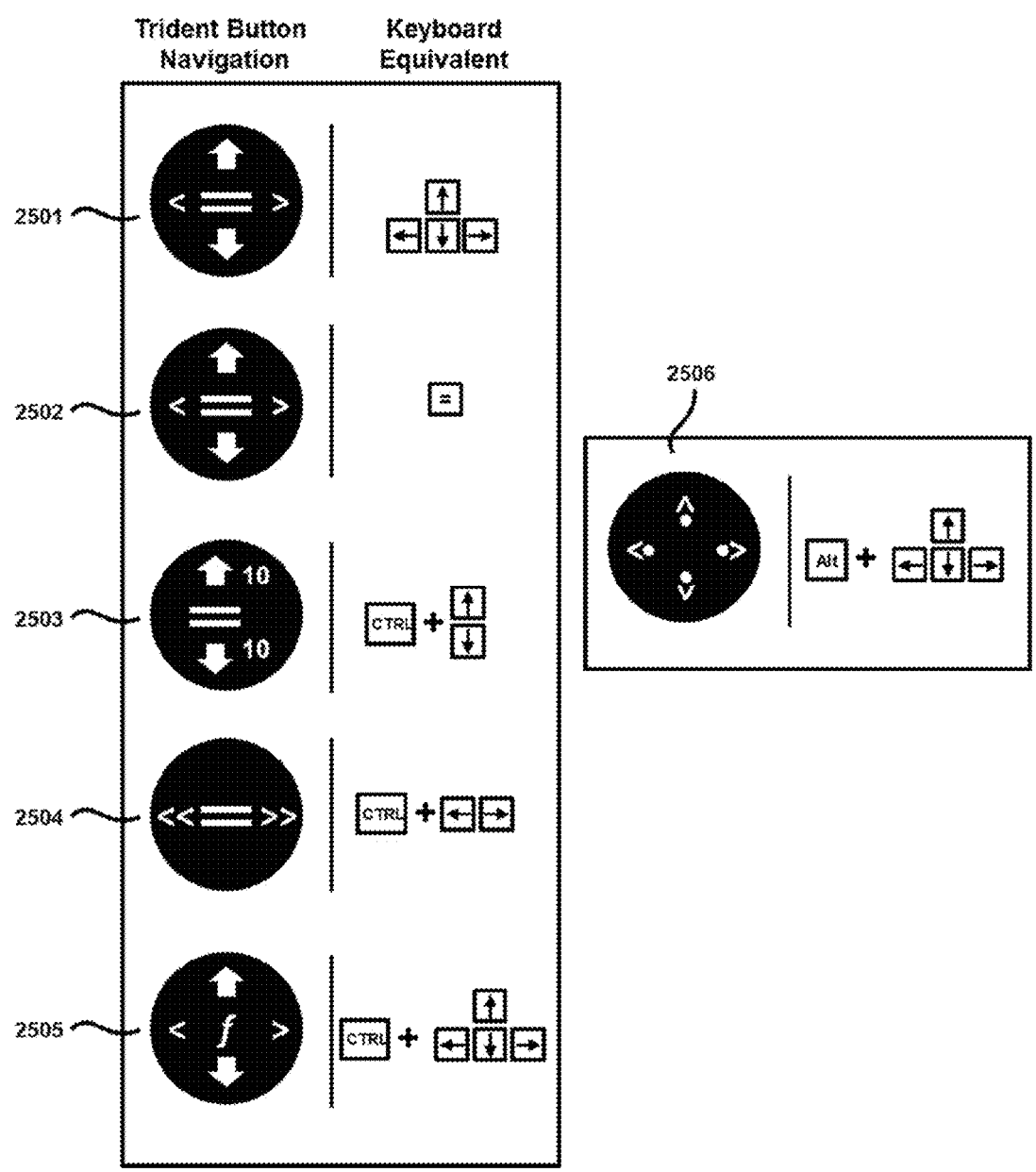
FIG. 25 is an example of a trident navigation tool in an embodiment of the system.

The display embodiments herein can all be manipulated and navigated using a trident tool such as shown in FIG. 25. FIG. 25 shows the navigation options of the trident tool. The arrowheads on the navigation tool allow movement through threads up/down and left/right. The =symbol will open an highlighted posting. Using control plus the key allows the user to jump up or down ten messages at a time. Control plus left/right allows the user to jump forward or back to the next screen of participants. The shift plus trident can jump from posting to posting that contains a search term and/or a trigger. Alt+Trident allows the user to jump to the next sub-thread, where sub-threads exist in the original bulletin board thread.

The navigation tool in one embodiment typically appears as at 2501 and 2502. The tool has four directional arrows (up, down, left, right) which can be accessed by clicking on the tool or by using the arrow keys on the keyboard. Clicking on one of the directional arrows will move the user one message where the step depends on where the user is accessing the tool.

Clicking on the equal sign, or using the equal sign on the keyboard, will toggle the expansion or contraction of a thread or message, depending on where the navigation tool is accessed. When a message or thread is highlighted, the keyboard is active for the navigation tool in the highlighted object.

By clicking the ctrl button on the keyboard, the navigation tool appears as at 2503. In this case, the up and down arrows show a number that represents how many steps in the chain each click of an arrow will advance. A click will move the user ten messages up or down for example. The left and right arrows at 2504 when the ctrl button is pressed will move the user to another screen if the display cannot show the entire data set at once.

Clicking on the shift key causes the navigation tool to appear as at 2505. This mode ties into, for example, a search operation. The user can define a term or terms, and each click of the directional arrows will move the user to the next message that satisfies the search criteria.

Alt clicking causes the navigation tool to appear as at 2506. This allows the user to move through threads and sub-threads of messages.

In one embodiment, the space bar can modify the slab during use. The space bar can create a buffer around the slab and make it more visible and more easily viewed.

Snap-To Commands

In another embodiment, the system may be manipulated via a number of commands that can affect the presentation of data in any of the display modes. An example list of these commands is presented in the below table.

"Snag-To" Hotkeys:

| | |
|---|---|
| A | Orients thread against time while allowing you to navigate the slab through the thread plane. Least relevant forward. |
| C | Flattens the 3D timeline so that all messages in a selected slab display with the same visual emphasis (making it easier to see all threads within the slab). |
| D | Orients profile against time while allowing you to navigate the slab through the thread plane. Most relevant forward. |
| E | Orients thread against time while allowing you to navigate the slab through the thread plane. Least relevant forward. |
| S | Orients thread against time while allowing you to navigate the slab through the thread plane. Most relevant forward. |
| X | Orients thread against profile while allowing you to navigate the slab through the thread plane. Least relevant forward. |
| Space Bar | Expands thread slabs by an empty space to get a cleared view (so that the slab you are viewing is separated by one box on either side). |
| P | Switches slab to profile selection. |
| T | Switches slab to time selection. |
| H | Switches slab to thread selection. |
| Ctrl + "<" or ">" | Select or de-select contiguous slabs. |

In Situ Expansion

Figure 27A:
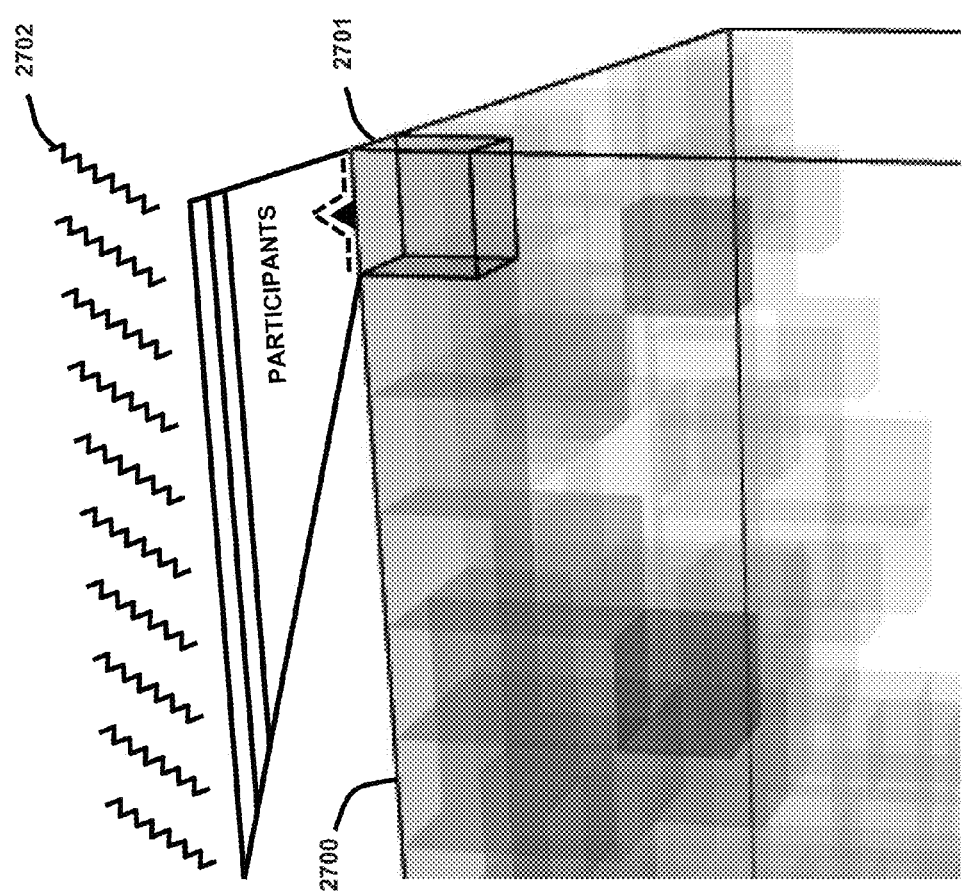
FIGS. 27A-27C are examples of in situ axis expansion in an embodiment of the system.
Figure 27B:
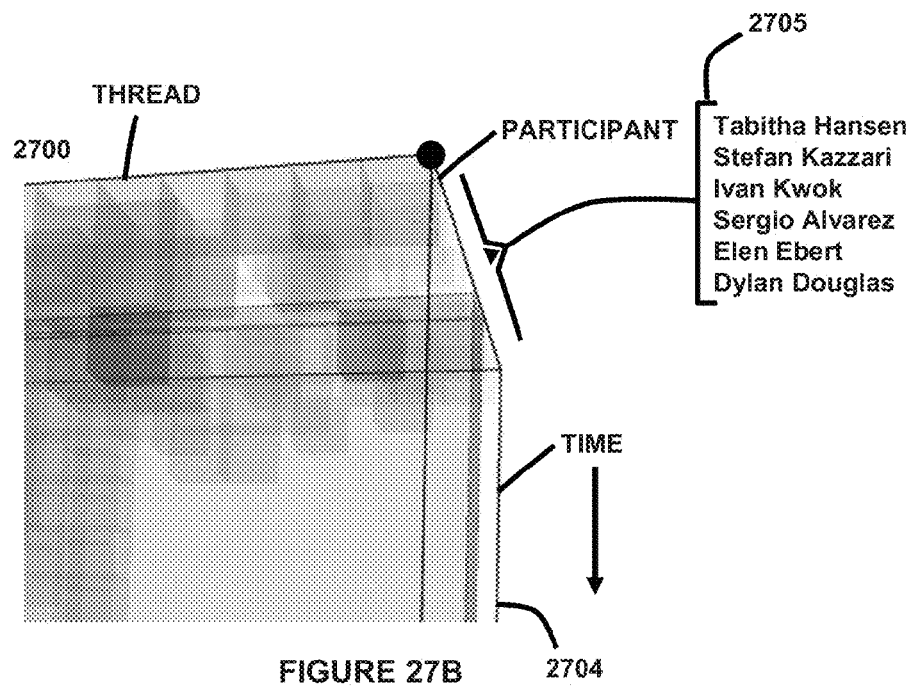
Figure 27C:
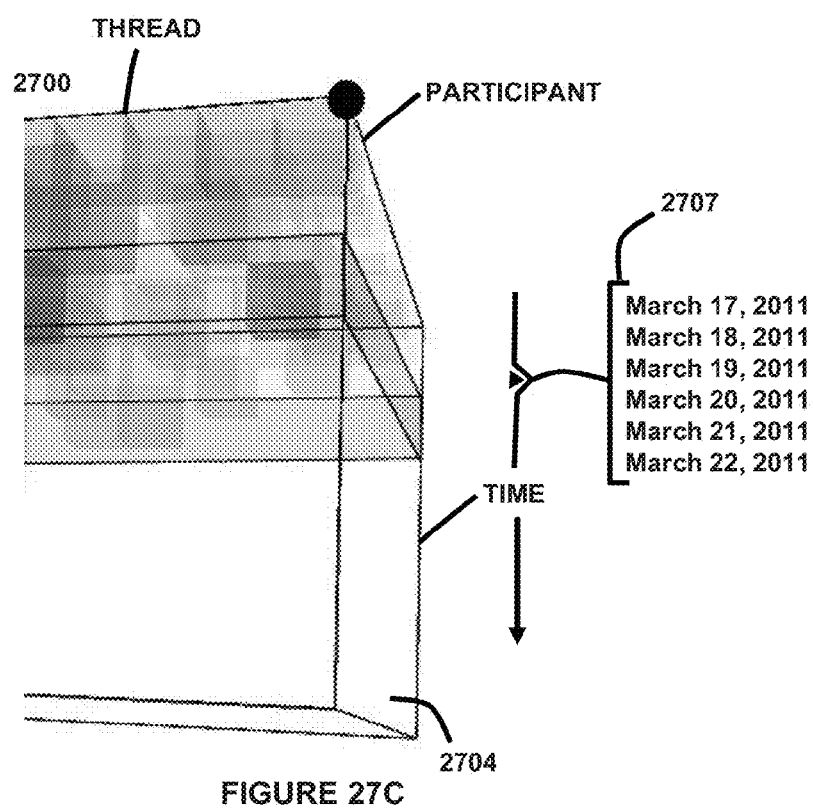

The system also contemplates an embodiment where portions of the Universe View can be expanded in situ in various forms to aid in the presentation, analysis, and understanding of data. FIG. 26 illustrates a Universe View 2600 with a cube of interest 2601 (e.g. the origin point cube in this example) expanded in place. The expanded cube 2601 includes information along its participant axis 2602 showing the names of participants associated with the data in the cube 2601. FIG. 27A illustrates an example of the participant axis 2702 associated with a cube 2701 of Universe View 2700. This allows the user and viewer to more easily see the participants associated with a cube of interest. As shown in FIGS. 27B and 27C, any axis can be expanded in situ, including the time axis.

Referring to FIG. 27B, the Universe View 2700 includes a slab 2704. The participant axis is expanded 2705. In FIG. 27C, the Universe View 2700 includes slab 2706. The time axis is expanded 2707.

Figure 28:
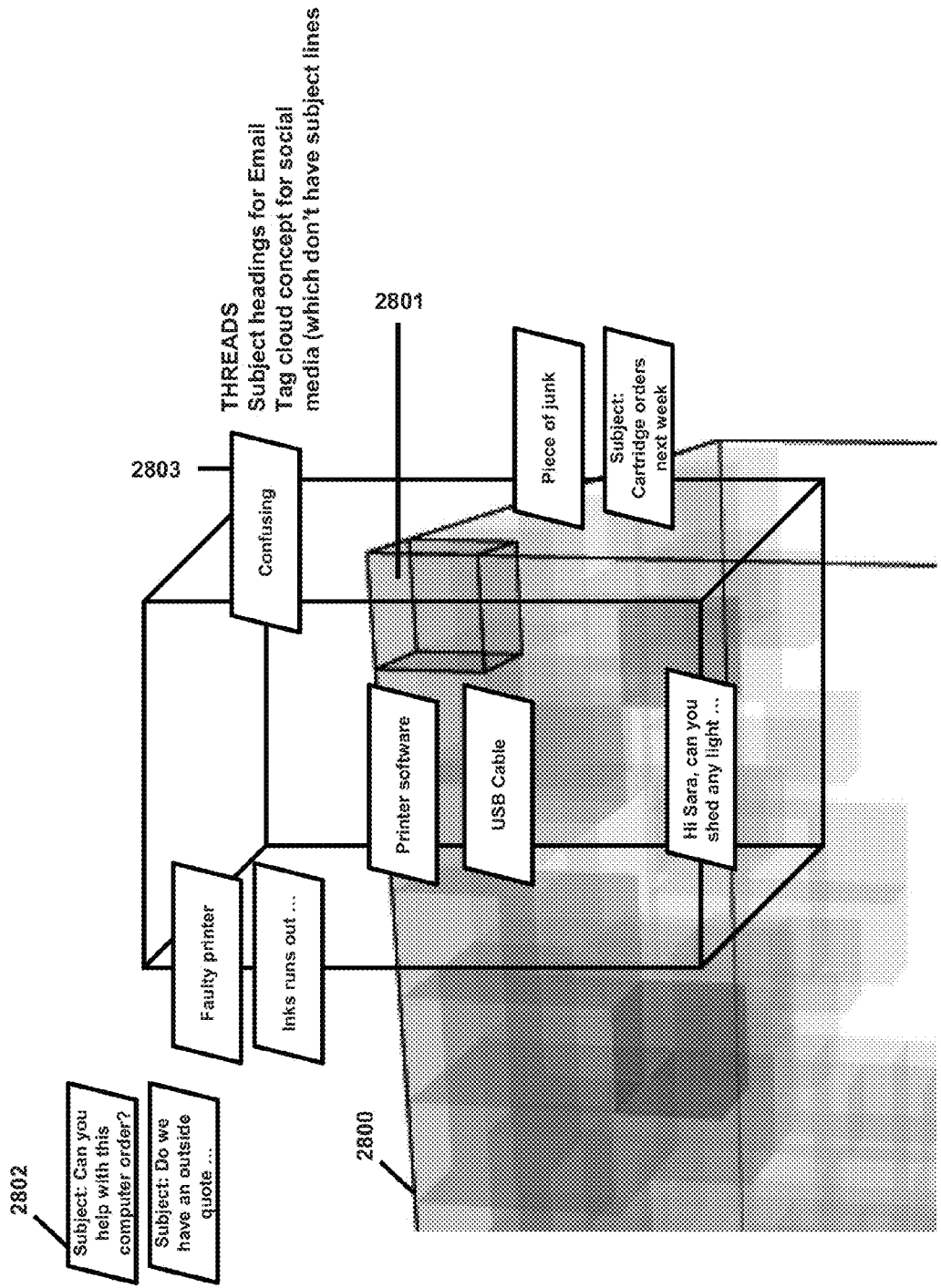
FIG. 28 is an example of in situ cube expansion with subject headings in one embodiment of the system.

In one embodiment, such as shown in FIG. 28, the expanded cube can include subject headings instead of, or in addition to, participants. The Universe View 2800 includes an expanded cube of interest 2801. The cube 2801 includes subject header labels such as 2802 and 2803. In one embodiment, these labels can be associated with one or more participants, or be the result of a filter or search.

Figure 29:
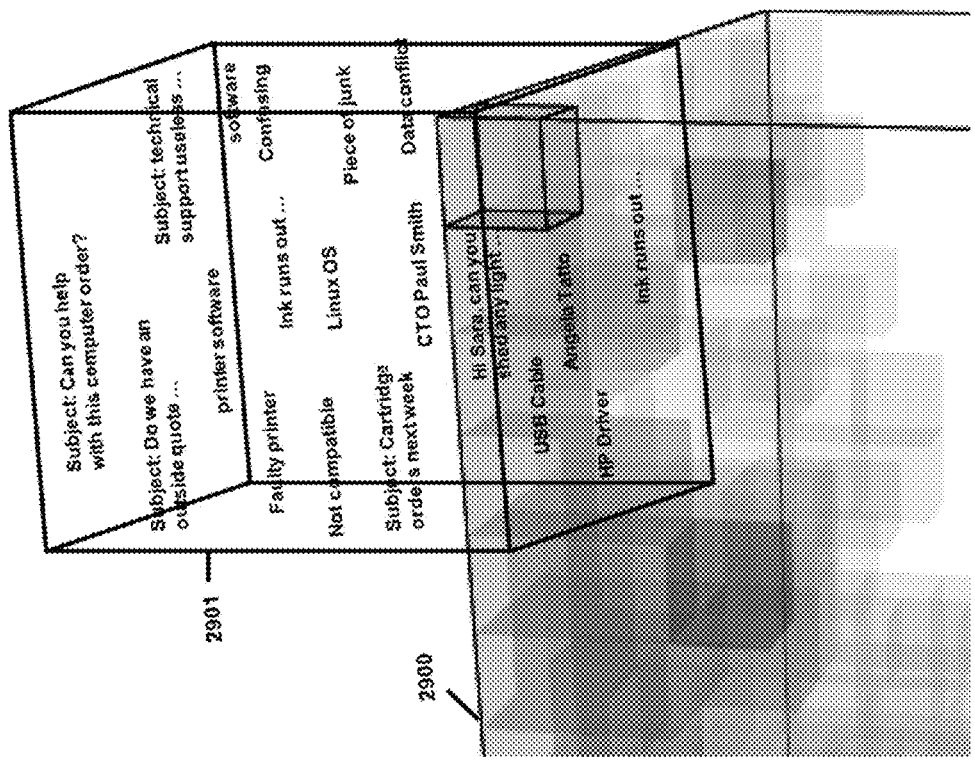
FIG. 29 is an example of in situ tag cloud expansion in one embodiment of the system.

In another embodiment, the in situ expansion of a cube of interest of a Universe View 2900 of FIG. 29 is a tag cloud 2901 of the terms of the cube of interest. It will be understood that the tag cloud can be filtered in any desired manner by one or more metrics or searches.

Timeline Views

Figure 30:
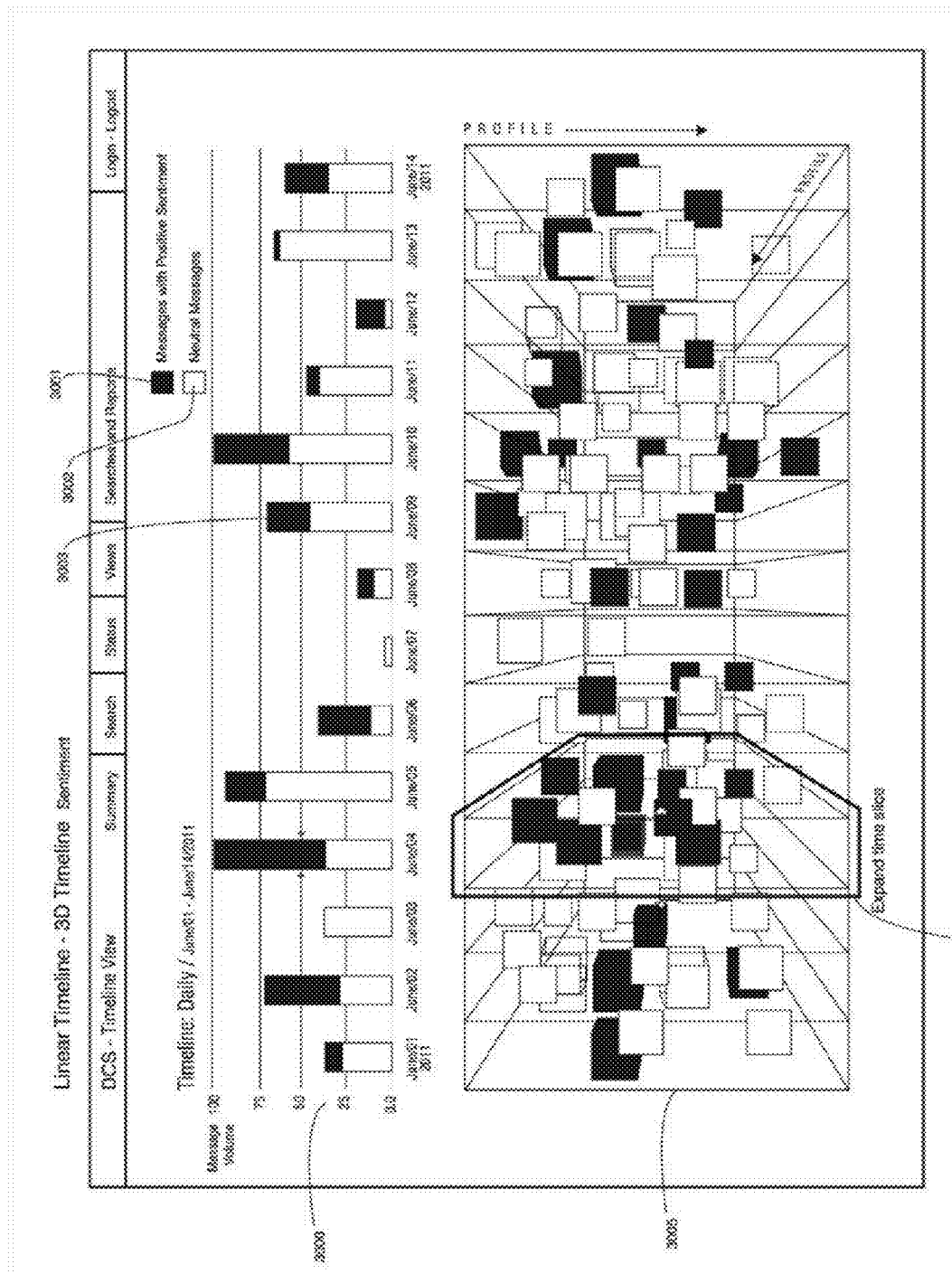
FIG. 30 illustrates an example of a timeline view of the system.

The system also allows for timeline views to be presented in a number of formats. Referring now to FIG. 30, an example of a timeline view is shown. In this example, the timeline 3000 is of a number of days in June 2011 with bar graphs illustrating the total number of messages each day based on a search or sort criteria. In FIG. 30, the messages are further sorted and represented in each bar by a binary metric, in this case messages with positive sentiment represented by orange 3001 and messages with neutral sentiment represented by gray 3002. It should be understood that other colors can be used to represent the presence or absence of sentiment of a message without departing from the scope and spirit of the system. Looking at the timeline, bar graph 3003 for Jun. 5, 2011 shows that the majority of messages for that day are neutral with a smaller amount of messages with positive sentiment.

Below the timeline 3000 of bar graphs is a 3D region 3005. In this region, each time division (e.g. day) is shown with individual messages represented as cubes having a color appropriate for their sentiment. Each time period is shown as a "slice" that is receding to a perspective vanishing point so as to appear three dimensional. The slices can be expanded by moving a mouse, cursor, or finger over the desired slice and clicking or touching (keyboard commands will work as well). An example of an expanded slice is time slice 3004 associated with Jun. 5, 2011. When expanded, the slice appears to grow toward the user, causing the front facet of the slice to expand vertically and horizontally and changing the relative size of objects within the slice.

In this embodiment, the 3D timeline view can add a third axis (e.g. a second profile axis) to show more details about who is communicating to who, resulting in a communication matrix for each segment of time on the time axis. Other properties may be set for each axis other than the time axis, depending on what the user wants to examine.

Figure 31:
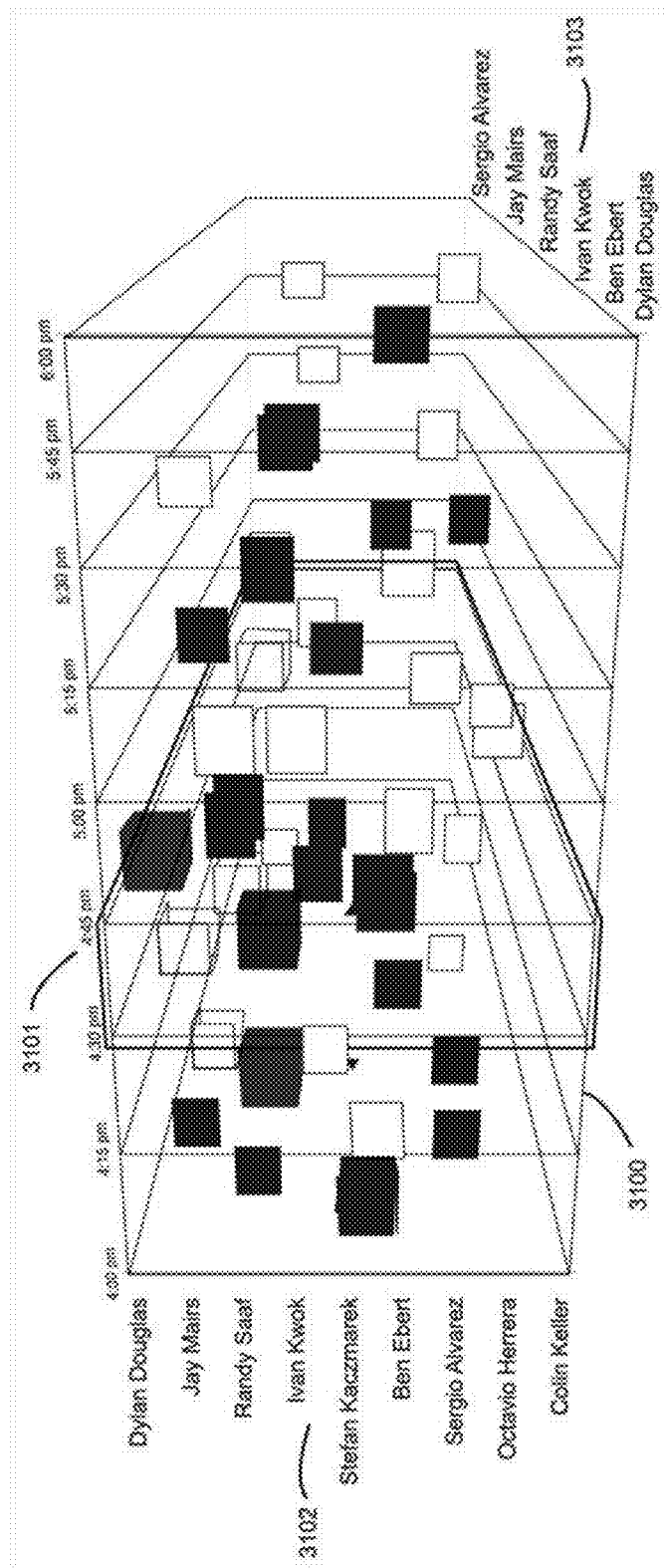
FIG. 31 illustrates an embodiment of the 3D timeline of FIG. 30.

In one embodiment, the time scale can be changed and other views may be provided. For example, if the slice 3004 is expanded, it can show the hours of Jun. 5, 2011 such as seen in FIG. 31. The expanded view 3100 remains in 3D perspective but is rotated slightly from a head on view to a slight perspective side view. Each time period can be expanded into its own time slices as desired. The example has each slice as a 15 minute increment between 4:00 p.m. and 6:00 p.m. Slice 3101 between 4:30 and 4:45 is selected (shown by a red or bold outline around the slice).

In this embodiment, the system can display participants such as at 3102 and 3103. The user can choose to show the threads of one or more slices in a list view as desired (such as shown in FIG. 10).

Figure 32:
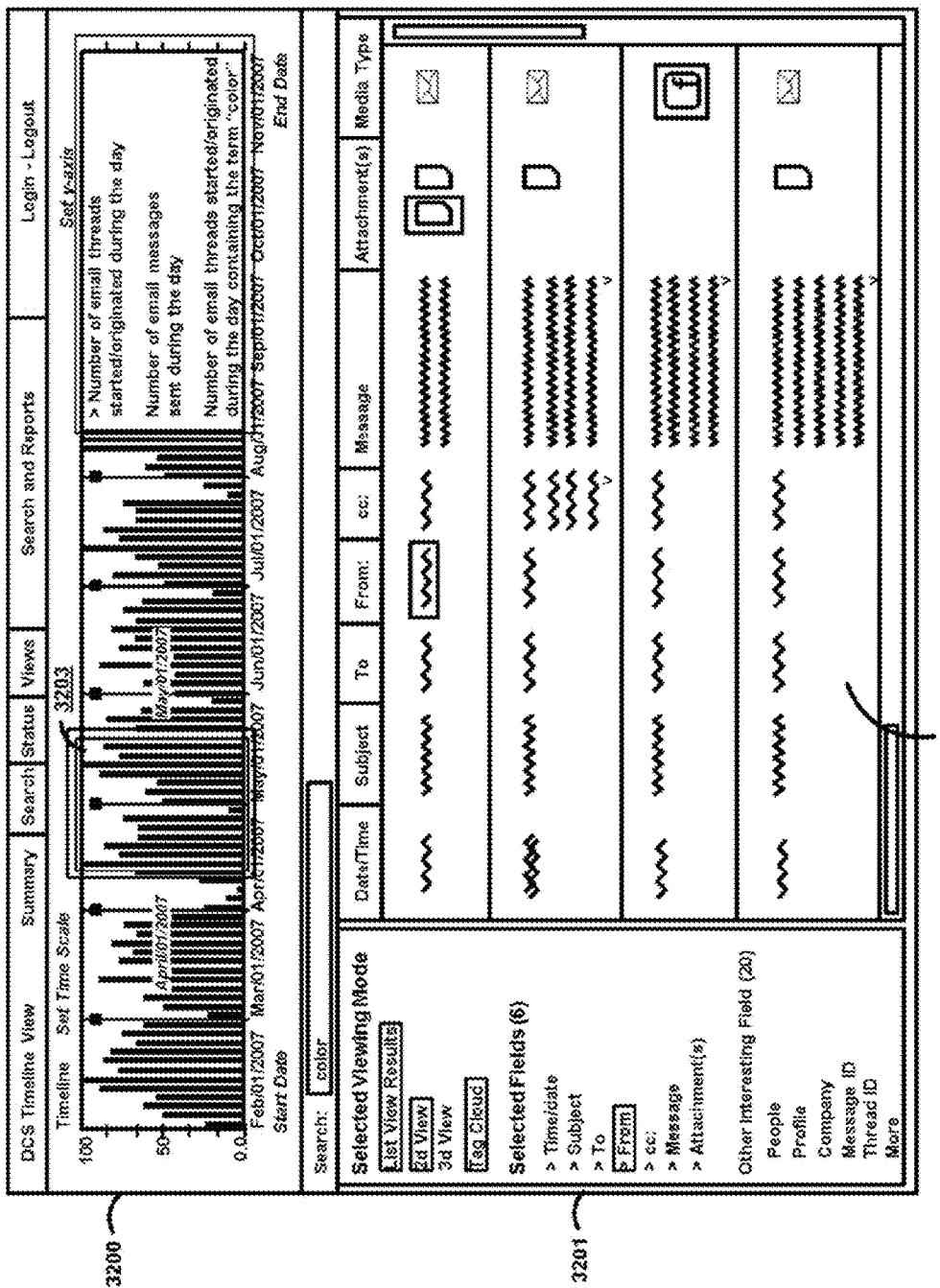
FIG. 32 illustrates and embodiment of a 2D timeline view.

In another embodiment, the 3D timeline view can be shown in a 2D version such as in FIG. 32. In this embodiment, the timeline region 3200 is displayed across the top of an image. The timeline 3200 can be of varying resolution and scale, from years to minutes (or even smaller increments), as desired. FIG. 32 illustrates months. A second region 3201 shows viewing modes that can be selected by the user. In this case, the user has selected the 2D view. Region 3202 displays the type of data presentation desired by the user. In this case a list view of the selected messages.

Referring to timeline 3200, a region 3203 is highlighted by a focus box. The box is used to span a time period of interest to the user. The box 3203 can be made wider or more narrow as desired, and/or the scale of the timeline can be changed appropriately. Region 3202 can show list view, tag cloud, thread view, or any other view described herein.

Boost Control

Figure 36:
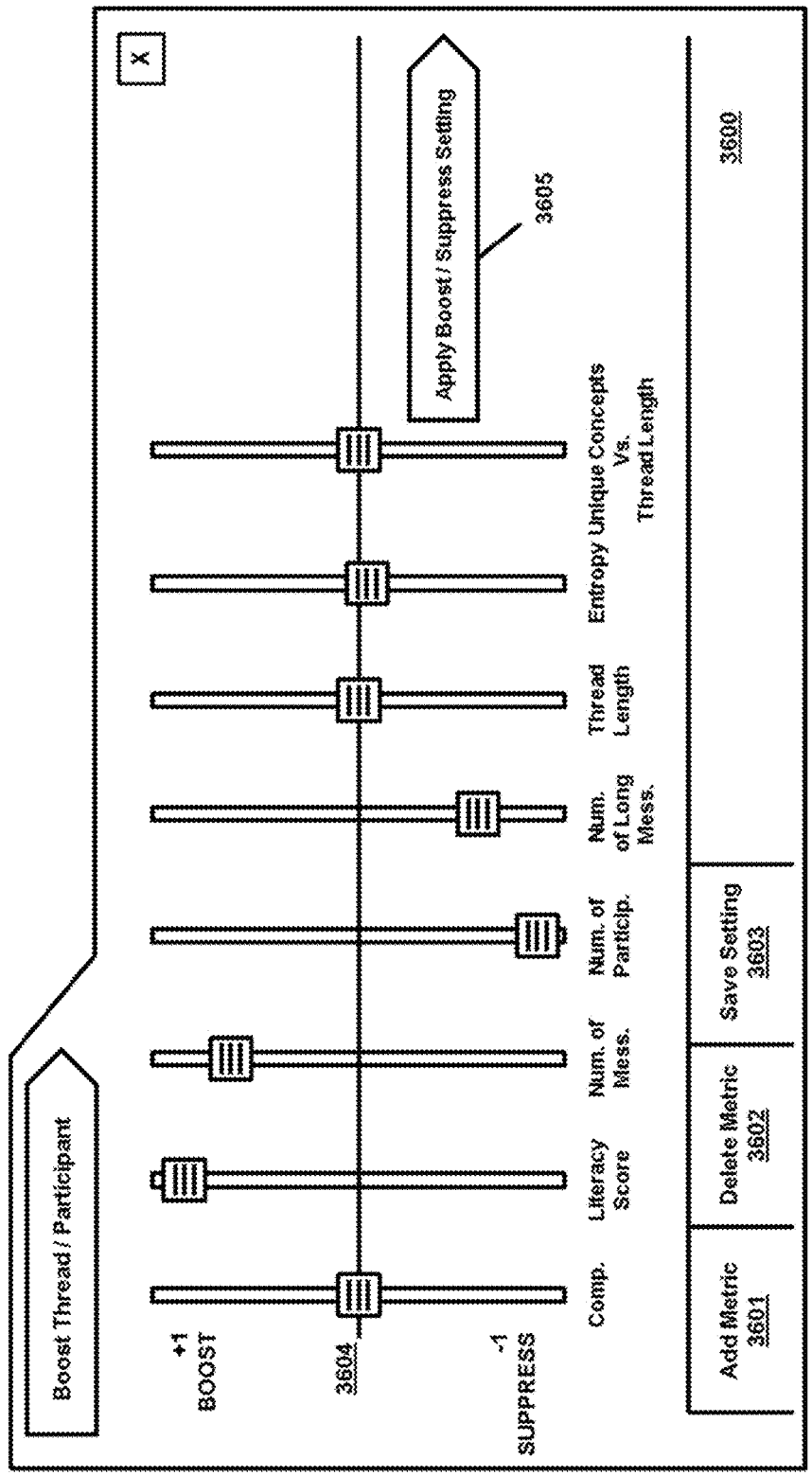
FIG. 36 illustrates a method of applying boost and suppress settings in an embodiment of the system.

In one embodiment, the system may provide an interactive "boost" button for any type of display. The boost button may appear on any display and may bring up a pop-up control panel or temporarily open an additional view where the user can boost certain parameters. When the user selects the boost button, a control panel appears such as the panel shown in FIG. 36. The boost/suppress control panel 3600 will appear with metrics already selected by the user for the current display. The user may add metrics 3601, delete metrics 3602, and save settings 3603. The control panel equalizer sliders 3604 for boosting or suppressing the selected metrics. For example, the user has elected to boost the literacy score metric to +1 and do suppress the number of participants metric to −1. After slider settings are selected, the user may choose to apply the booster settings 3605 to the current display. One impact of the boost/suppress control panel is the positioning of participants and threads etc, in various views based on the metrics. This allows the metrics to be combined with the user-selected weightings to generate a single composite score on the fly ("tune" the search results and corresponding views in multiple iterations without changing the search query). The boost control can be applied to search results in general, including internet search engines. Boost sliders for boost/suppress thread/participant according to metric can be applied to the 3D Timeline View (or the 3D Thread View cube), but instead of being boost/suppress the slider values could represent threshold values or cutoff points for things to be shown in the 3D Timeline View or the 3D Thread View cube. The boost sliders can be adapted for various metrics in various presentation views as desired.

Color Tracking

The system allows the use of color to represent different metrics as well as content of communications. In one embodiment, the system applies data mining techniques to communications content to determine a "sentiment" of the communication. When sentiment is determined, the communication can be assigned a color based on the sentiment, including positive, negative, angry, happy, neutral, and the like. Multiple sentiments can be defined and displayed. When multiple communications are grouped, such as in a thread or a universe cube view, the system can assign the predominant sentiment to the collection. During drill down, the sentiments of smaller subsets of data are displayed based on the contents of the data. This allows the user to easily track and view sentiment of communications based on the color coding. This may be particularly helpful in customer service applications to see if a user can be satisfied (e.g. moved from angry/negative to positive or at least neutral during a customer service experience.

Figure 33:
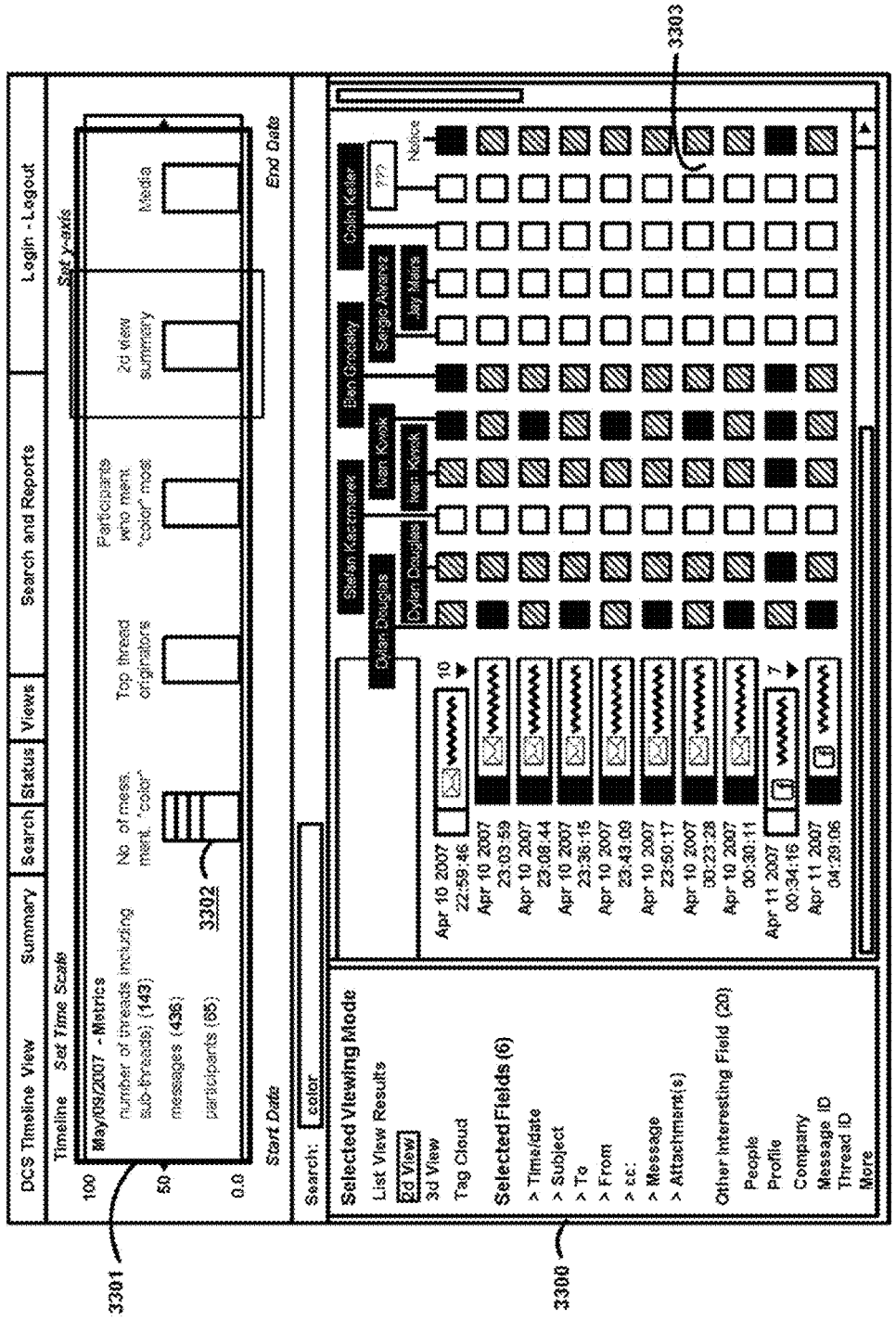
FIG. 33 illustrates the use of color to represent metrics in an embodiment of the system.

An example of color tracking is illustrated in FIG. 33. The display 3300 in this embodiment includes a region 3301 for displaying color coded information about communications based on various metrics, where each metric can be represented by a particular color, either a default system assigned color or a user defined color. For example, bar graph 3302 shows the number of messages mentioning a particular term with different colors representing the number of mentions (e.g. orange for no mentions, green for 1-5 mentions, etc.). A second display region 3303 shows a list view of results organized into columns.

Circle Embodiment

Figure 34:
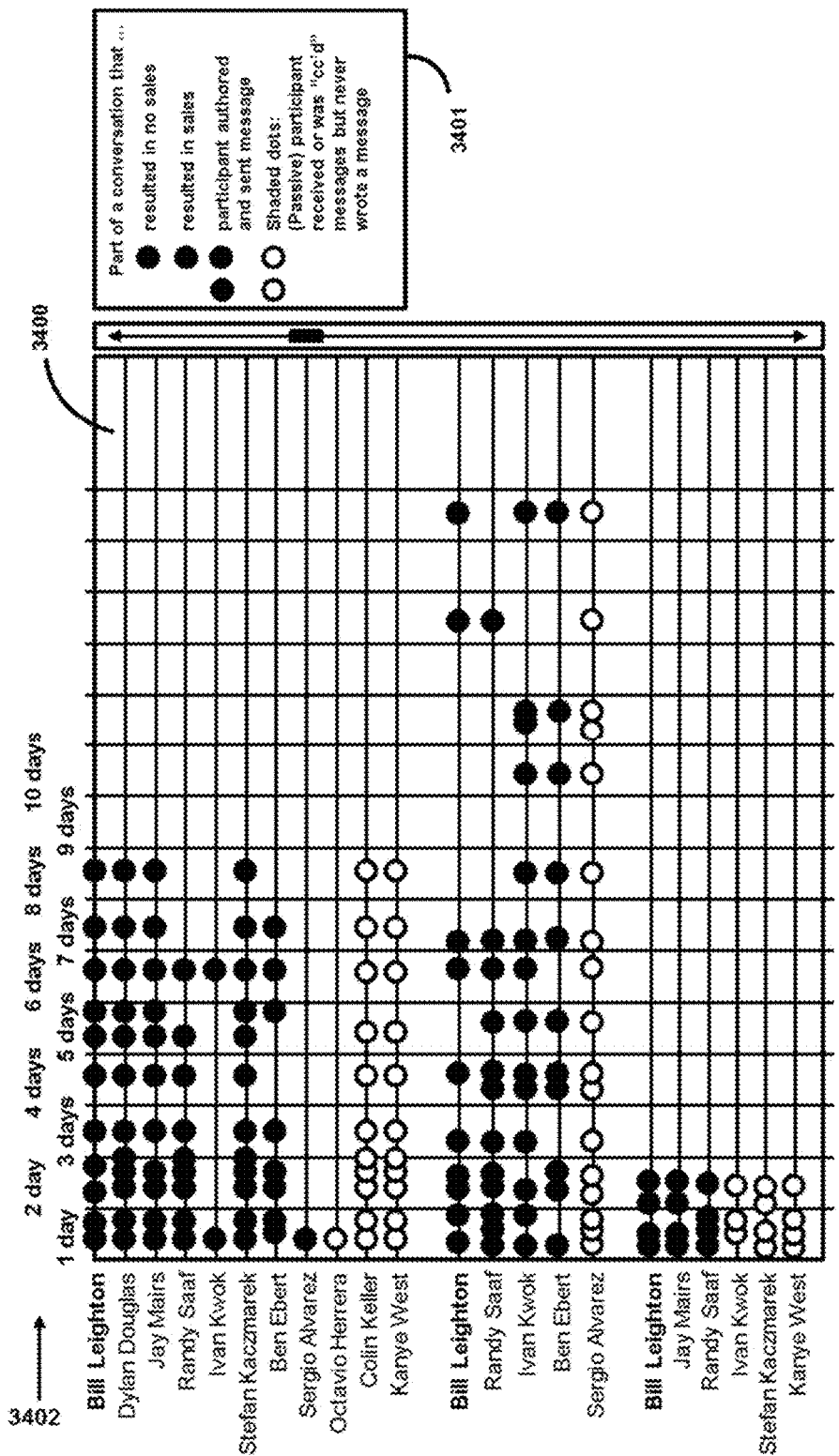
FIG. 34 illustrates the use of circles to represent metrics or other properties in an embodiment of the system.

FIG. 34 illustrates another embodiment of the system where data is represented using circles with color, shading, and outlining representing different metrics. The display 3400 illustrates communications between one participant of interest (e.g. Bill Leighton) with various other participants. The system includes a time line 3402 to represent some period of interest. As shown in the legend 3401, each communication is represented by a circle. The color of the circle represents some metric associated with the communication. In this case, an orange circle represents a communication that did not result in a sale, while a gray circle represents a communication that did result in a sale.

The number of circles represents the number of communications between the participants in each time period of the timeline 3402. Shading is used to represent information about the communications, with light shading representing a passive participant who did not write any messages. An outlined circle represents a participant who has authored and sent a communication.

Example Computer System

Figure 20:
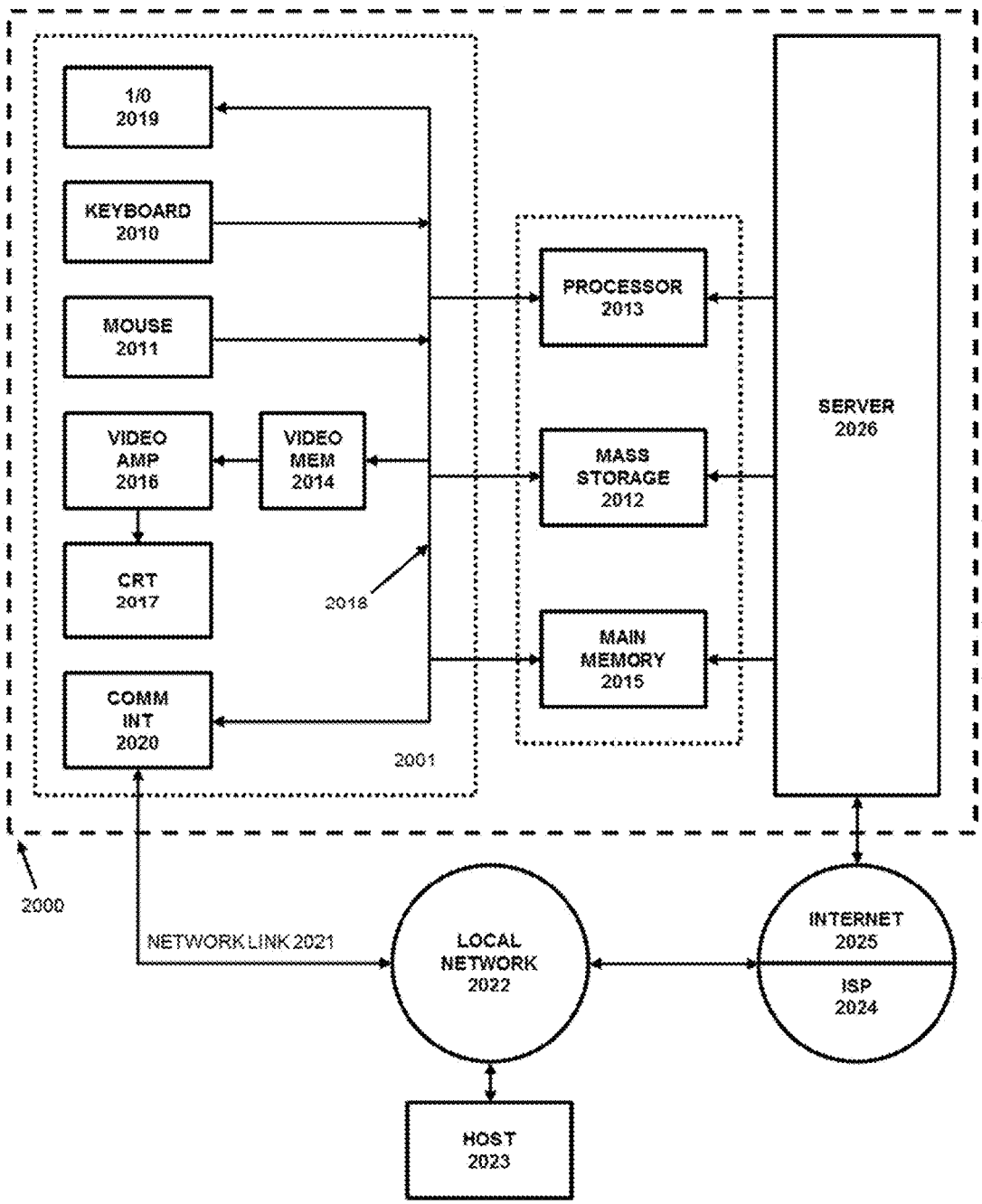
FIG. 20 is an example computer system for implementing the system.

An embodiment of the system can be implemented as computer software in the form of computer readable program code executed in a general purpose computing environment such as environment 2000 illustrated in FIG. 20, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 2010 and mouse 2011 are coupled to a system bus 2018. The keyboard and mouse are for introducing user input to the computer system and communicating that user input to central processing unit (CPU 2013. Other suitable input devices may be used in addition to, or in place of, the mouse 2011 and keyboard 2010, such as a tablet PC, iPad, touchscreen device, smartphonelPDA, etc. I/O (input/output) unit 2020 coupled to bi-directional system bus 2018 represents such I/O elements as a printer, A/V (audio/video) I/O, etc.

Computer 2001 may include a communication interface 2020 coupled to bus 2018. Communication interface 2020 provides a two-way data communication coupling via a network link 2021 to a local network 2022. For example, if communication interface 2020 is an integrated services digital network (ISDN) card or a modem, communication interface 2020 provides a data communication connection to the corresponding type of telephone line, which comprises part of network link 2021. If communication interface 2020 is a local area network (LAN) card, communication interface 2020 provides a data communication connection via network link 2021 to a compatible LAN. Wireless links are also possible. In any such implementation, communication interface 2020 sends and receives electrical, electromagnetic or optical signals which carry digital data streams representing various types of information.

Network link 2021 typically provides data communication through one or more networks to other data devices. For example, network link 2021 may provide a connection through local network 2022 to local server computer 2023 or to data equipment operated by ISP 2024. ISP 2024 in turn provides data communication services through the world wide packet data communication network now commonly referred to as the "Internet" 2025 Local network 2022 and Internet 2025 both use electrical, electromagnetic or optical signals which carry digital data streams. The signals through the various networks and the signals on network link 2021 and through communication interface 2020, which carry the digital data to and from computer 2000, are exemplary forms of carrier waves transporting the information.

Processor 2013 may reside wholly on client computer 2001 or wholly on server 2026 or processor 2013 may have its computational power distributed between computer 2001 and server 2026. Server 2026 symbolically is represented in FIG. 20 as one unit, but server 2026 can also be distributed between multiple "tiers". In one embodiment, server 2026 comprises a middle and back tier where application logic executes in the middle tier and persistent data is obtained in the back tier. In the case where processor 2013 resides wholly on server 2026, the results of the computations performed by processor 2013 are transmitted to computer 2001 via Internet 2025, Internet Service Provider (ISP) 2024, local network 2022 and communication interface 2020. In this way, computer 2001 is able to display the results of the computation to a user in the form of output.

Computer 2001 includes a video memory 2014, main memory 2015 and mass storage 2012, all coupled to bi-directional system bus 2018 along with keyboard 2010, mouse 2011 and processor 2013.

As with processor 2013, in various computing environments, main memory 2015 and mass storage 2012, can reside wholly on server 2026 or computer 2001, or they may be distributed between the two. Examples of systems where processor 2013, main memory 2015, and mass storage 2012 are distributed between computer 2001 and server 2026 include thin-client computing architectures and other personal digital assistants, Internet ready cellular phones and other Internet computing devices, and in platform independent computing environments, The mass storage 2012 may include both fixed and removable media, such as magnetic, optical or magnetic optical storage systems or any other available mass storage technology. The mass storage may be implemented as a RAID array or any other suitable storage means. Bus 2018 may contain, for example, thirty-two address lines for addressing video memory 2014 or main memory 2015. The system bus 2018 also includes, for example, a 32-bit data bus for transferring data between and among the components, such as processor 2013, main memory 2015, video memory 2014 and mass storage 2012. Alternatively, multiplex data/address lines may be used instead of separate data and address lines.

In one embodiment of the invention, the processor 2013 is a microprocessor such as manufactured. by Intel, AMD, Sun, etc. However, any other suitable microprocessor or microcomputer may be utilized. Main memory 2015 is comprised of dynamic random access memory (DRAM). Video memory 2014 is a dual-ported video random access memory. One port of the video memory 2014 is coupled to video amplifier 2016. The video amplifier 2016 is used to drive the cathode ray tube (CRT) raster monitor 2017. Video amplifier 2016 is well known in the art and may be implemented by any suitable apparatus. This circuitry converts pixel data stored in video memory 2014 to a raster signal suitable for use by monitor 2017. Monitor 2017 is a type of monitor suitable for displaying graphic images, such as computer monitor, tablet PC, iPad, smartphone/PDA, touchscreen device, etc Computer 2001 can send messages and receive data, including program code, through the network(s), network link 2021, and communication interface 2020. In the Internet example, remote server computer 2026 might transmit a requested code for an application program through Internet 2025, ISP 2024, local network 2022 and communication interface 2020. The received code maybe executed by processor 2013 as it is received, and/or stored in mass storage 2012, or other non-volatile storage for later execution. In this manner, computer 2000 may obtain application code in the form of a carrier wave. Alternatively, remote server computer 2026 may execute applications using processor 2013, and utilize mass storage 2012, and/or video memory 2015. The results of the execution at server 2026 are then transmitted through Internet 2025, ISP 2024, local network 2022 and communication interface 2020. In this example, computer 2001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The system can also be implemented via cloud computing.

The computer systems described above are for purposes of example only. An embodiment of the invention may be implemented in any type of computer system or programming or processing environment.

The invention claimed is:

1. A method of representing data comprising: in a processing system that tracks multiple participants,
    collecting pieces of communication data from a plurality of sources;
    normalizing the pieces of communication data, such that each piece of communication data includes multiple common fields;
    identifying participants related to each piece of communication data; and displaying a representation of multiple pieces of the communication data as a three dimensional collection of cubes, where each cube represents a subset of the multiple pieces of communication data, and wherein a first axis for each cube represents communication threads, a second axis represents participants and a third axis represents time; and
    generating a differential set of terms for each 3D slice, wherein the differential set of terms indicates a subtraction of one or more terms of a previous 3D slice from one or more terms in a current 3D slice.

2. The method of claim 1, wherein each source of the plurality of sources includes communication services that produce communication data related to one or more of the following: email, social media, medical data and travel data.

3. The method of claim 1, comprising allowing a user to select a plane that cuts through the three dimensional collection of cubes, the plane being oriented relative to one common axis of the cubes, wherein selecting the plane indicates a subset of the multiple pieces of communication data.

4. The method of claim 3, comprising displaying an expanded 2D representation of the communication data indicated by the plane.

5. The method of claim 4, comprising continuously updating the expanded 2D representation as the user moves the location of the plane, causing the subset of the multiple pieces of communication data to change.

6. The method of claim 3, comprising updating a tag cloud associated with the selected plane, wherein the tag cloud comprises one or more of the following: frequently occurring terms in the communication data, frequently occurring words in the communication data, frequently occurring concepts in the communication data and frequently occurring objects in the communication data.

7. The method of claim 1, comprising:
allowing a user to select one of the cubes from the three dimensional collection of cubes; and
displaying an expanded view of the selected cube in situ, wherein the expanded view of the cube shows more detail about the communications data associated with the selected cube.

8. The method of claim 7, comprising:
displaying multiple sub-cubes within the expanded view of the cube;
allowing a user to select one of the sub-cubes; and
displaying an expanded view of the selected sub-cube, wherein the expanded view of the sub-cube shows more detail about the communications data associated with the selected sub-cube.

9. The method of claim 7, wherein the expanded view of the selected cube includes a tag cloud that comprises one or more of the following:
frequently occurring terms in the communication data, frequently occurring words in the communication data, frequently occurring concepts in the communication data and frequently occurring objects in the communication data.

10. The method of claim 1, comprising allowing a user to select or alter data filter parameters, wherein displaying the representation of multiple pieces of the communication data includes considering the data filter parameters to determine which pieces of the communications data will be represented.

11. The method of claim 10, further comprising:
allowing a user to boost or suppress one or more of the data filter parameters on the fly; and
displaying an updated view of the three dimensional collection of cubes, wherein the updated view represents pieces of the communication data that correspond to the boosted or suppressed data filter parameters.

12. A method of representing data comprising:
in a processing system that tracks multiple participants,
collecting pieces of communication data from a plurality of sources wherein each piece of the communication data is related to two or more of the participants and each participant is related to one or more pieces of the communication data;
identifying the participants related to each piece of communication data;
displaying a representation of multiple pieces of the communication data related to multiple participants as multiple adjacent 3D slices spread along a timeline, wherein the thickness of each 3D slice represents a time period, and wherein a first axis along the depth of the 3D slice represents one or more of the multiple participants, and wherein a second axis along the height of the 3D slice represents one or more of the multiple participants; and
generating a differential set of terms for each 3D slice, wherein the differential set of terms indicates a subtraction of one or more terms of a previous 3D slice from one or more terms in a current 3D slice.

13. The method of claim 12, comprising sorting threads to order the participants in the multiple adjacent 3D slices spread along the timeline.

14. The method of claim 13, wherein the threads are sorted according to one or both of the following: a number of pointers to a thread and a forwarding frequency of a message.

15. The method of claim 12, comprising displaying multiple cubes within each 3D slice, each cube representing a piece of communication data common to two of the multiple participants, wherein the location of each cube within the 3D slice indicates which two participants are related to the piece of communication data.

16. The method of claim 12, comprising:
allowing a user to select one of the 3D slices; and
displaying an expanded view of the 3D slice.

* * * * *